US010140812B2

(12) United States Patent
Walker et al.

(10) Patent No.: US 10,140,812 B2
(45) Date of Patent: Nov. 27, 2018

(54) METHOD AND APPARATUS FOR EMPLOYING FLAT RATE PLAY

(75) Inventors: Jay S. Walker, Ridgefield, CT (US); James A. Jorasch, Stamford, CT (US); Geoffrey M. Gelman, Stamford, CT (US); Stephen C. Tulley, Fairfield, CT (US); Steven M. Santisi, Ridgefield, CT (US); Norman C. Gilman, Stamford, CT (US)

(73) Assignee: IGT, Las Vegas, NV (US)

( * ) Notice: Subject to any disclaimer, the term of this patent is extended or adjusted under 35 U.S.C. 154(b) by 684 days.

(21) Appl. No.: 13/253,628

(22) Filed: Oct. 5, 2011

(65) Prior Publication Data

US 2012/0028698 A1 Feb. 2, 2012

Related U.S. Application Data

(60) Division of application No. 11/428,642, filed on Jul. 5, 2006, now Pat. No. 8,062,122, which is a continuation of application No. 10/420,066, filed on Apr. 21, 2003, now Pat. No. 8,021,229.

(60) Provisional application No. 60/374,385, filed on Apr. 19, 2002.

(51) Int. Cl.
*A63F 13/00* (2014.01)
*G07F 19/00* (2006.01)
*G07F 17/32* (2006.01)

(52) U.S. Cl.
CPC .......... *G07F 17/3244* (2013.01); *G07F 17/32* (2013.01); *G07F 17/3232* (2013.01); *G07F 17/3239* (2013.01); *G07F 17/3269* (2013.01)

(58) Field of Classification Search
CPC .. G06F 17/34; G06F 17/3262; G06F 17/3255; G06F 17/326; G06F 17/3244
USPC .................................. 463/25–26, 16, 20, 27
See application file for complete search history.

(56) References Cited

U.S. PATENT DOCUMENTS 4,467,424 A 8/1984 Hedges et al.
4,636,951 A 1/1987 Harlick
4,659,087 A 4/1987 Shen et al.
4,669,731 A 6/1987 Clarke
4,764,666 A 8/1988 Bergeron
4,880,237 A 11/1989 Kishishita
4,991,848 A 2/1991 Greenwood et al.
5,069,453 A 12/1991 Koza et al.
5,112,050 A 5/1992 Koza et al.
5,123,649 A 6/1992 Tiberio
5,178,390 A 1/1993 Okada
5,275,400 A 1/1994 Weingardt et al.

(Continued)

OTHER PUBLICATIONS

"Electronic Bingo System", Network Gaming International Corporation, (http://network-bingo com/bingo htm), download date: Nov. 13, 1996, 5pp.

(Continued)

*Primary Examiner* — William H McCulloch, Jr.
(74) *Attorney, Agent, or Firm* — Neal, Gerber & Eisenberg LLP

(57) ABSTRACT

Systems and methods are provided allowing a player to play a gaming device and receive a predetermined number of outcomes in exchange for a payment. The gaming device generates at least the predetermined number of outcomes, and adjusts a balance of the player device based on the outcomes. The player can continue playing regardless of whether the balance is less than zero.

7 Claims, 11 Drawing Sheets

(56) References Cited

U.S. PATENT DOCUMENTS

| | | | | |
|---|---|---|---|---|
| 5,287,269 | A | 2/1994 | Dorrough et al. | |
| 5,290,033 | A | 3/1994 | Bittner et al. | |
| 5,377,975 | A | 1/1995 | Clapper, Jr. | |
| 5,401,024 | A | 3/1995 | Simunek | |
| 5,429,361 | A | 7/1995 | Raven et al. | |
| 5,536,008 | A | 7/1996 | Clapper, Jr. | |
| 5,551,692 | A | 9/1996 | Pettit et al. | |
| 5,569,082 | A | 10/1996 | Kaye | |
| 5,570,885 | A | 11/1996 | Ornstein | |
| 5,580,311 | A | 12/1996 | Haste, III | |
| 5,595,538 | A | 1/1997 | Haste, III | |
| 5,609,337 | A | 3/1997 | Clapper, Jr. | |
| 5,613,912 | A | 3/1997 | Slater | |
| 5,621,200 | A | 4/1997 | Irwin et al. | |
| 5,634,012 | A | 5/1997 | Stefik et al. | |
| 5,647,592 | A | 7/1997 | Gerow | |
| 5,657,899 | A | 8/1997 | Stoken | |
| 5,704,835 | A * | 1/1998 | Dietz, II | 463/20 |
| 5,735,432 | A | 4/1998 | Stoken et al. | |
| 5,741,183 | A | 4/1998 | Acres et al. | |
| 5,749,784 | A | 5/1998 | Clapper, Jr. | |
| 5,758,875 | A | 6/1998 | Giacalone, Jr. | |
| 5,766,075 | A | 6/1998 | Cook et al. | |
| 5,768,382 | A | 6/1998 | Schneier et al. | |
| 5,770,533 | A | 6/1998 | Franchi | |
| 5,772,509 | A | 6/1998 | Weiss | |
| 5,800,268 | A | 9/1998 | Molnick | |
| 5,810,360 | A | 9/1998 | Srichayaporn | |
| 5,816,917 | A | 10/1998 | Kelmer et al. | |
| 5,830,067 | A | 11/1998 | Graves et al. | |
| 5,833,538 | A | 11/1998 | Weiss | |
| 5,855,515 | A | 1/1999 | Pease et al. | |
| 5,910,048 | A | 6/1999 | Feinberg | |
| 5,970,143 | A | 10/1999 | Schneier et al. | |
| 5,984,779 | A | 11/1999 | Bridgeman et al. | |
| 6,001,016 | A | 12/1999 | Walker et al. | |
| 6,012,983 | A | 1/2000 | Walker et al. | |
| 6,068,552 | A * | 5/2000 | Walker et al. | 463/21 |
| 6,077,163 | A | 6/2000 | Walker et al. | |
| 6,142,872 | A * | 11/2000 | Walker | G07F 17/3276 340/323 R |
| 6,168,522 | B1 | 1/2001 | Walker et al. | |
| 6,203,428 | B1 | 3/2001 | Giobbi et al. | |
| 6,206,782 | B1 | 3/2001 | Walker et al. | |
| 6,241,607 | B1 * | 6/2001 | Payne et al. | 463/20 |
| 6,244,957 | B1 | 6/2001 | Walker et al. | |
| 6,299,533 | B1 | 10/2001 | Parra et al. | |
| 6,315,662 | B1 | 11/2001 | Jorasch et al. | |
| 6,319,125 | B1 | 11/2001 | Acres | |
| 6,319,127 | B1 | 11/2001 | Walker et al. | |
| 6,343,989 | B1 | 2/2002 | Wood et al. | |
| 6,371,852 | B1 | 4/2002 | Acres | |
| 6,389,538 | B1 | 5/2002 | Gruse et al. | |
| 6,409,602 | B1 | 6/2002 | Wiltshire et al. | |
| 6,471,208 | B2 * | 10/2002 | Yoseloff et al. | 273/143 R |
| 6,508,710 | B1 | 1/2003 | Paravia et al. | |
| 6,511,377 | B1 | 1/2003 | Weiss | |
| 6,527,638 | B1 | 3/2003 | Walker et al. | |
| 6,565,434 | B1 | 5/2003 | Acres | |
| 6,582,306 | B1 | 6/2003 | Kaminkow | |
| 6,605,001 | B1 | 8/2003 | Tarantino | |
| 6,620,045 | B2 * | 9/2003 | Berman et al. | 463/25 |
| 6,676,511 | B2 * | 1/2004 | Payne et al. | 463/20 |
| 6,685,563 | B1 | 2/2004 | Meekins et al. | |
| 6,709,331 | B2 | 3/2004 | Berman | |
| 6,722,983 | B2 | 4/2004 | Kaminkow et al. | |
| 6,726,563 | B1 | 4/2004 | Baerlocher et al. | |
| 6,733,389 | B2 | 5/2004 | Webb et al. | |
| 6,769,983 | B2 | 8/2004 | Slomiany | |
| 6,793,578 | B2 | 9/2004 | Luccesi et al. | |
| 6,800,030 | B2 | 10/2004 | Acres | |
| 6,846,238 | B2 | 1/2005 | Wells | |
| 6,878,063 | B2 | 4/2005 | Manfredi et al. | |
| 6,896,616 | B2 | 5/2005 | Weiss | |
| 6,965,868 | B1 | 11/2005 | Bednarek | |
| 6,997,807 | B2 * | 2/2006 | Weiss | 463/25 |
| 7,063,617 | B2 | 6/2006 | Brosnan et al. | |
| 7,070,501 | B2 * | 7/2006 | Cormack et al. | 463/16 |
| 7,076,652 | B2 | 7/2006 | Ginter et al. | |
| 7,140,964 | B2 | 11/2006 | Walker et al. | |
| 7,213,005 | B2 | 5/2007 | Mourad et | |
| 7,229,353 | B2 * | 6/2007 | Seelig | 463/25 |
| 7,416,485 | B2 * | 8/2008 | Walker et al. | 463/25 |
| 7,722,458 | B2 * | 5/2010 | Walker et al. | 463/25 |
| 7,785,196 | B2 | 8/2010 | Baerlocher et al. | |
| 7,828,645 | B2 | 11/2010 | Walker et al. | |
| 7,862,416 | B2 | 1/2011 | Walker et al. | |
| 7,862,424 | B2 | 1/2011 | Walker et al. | |
| 7,862,426 | B2 | 1/2011 | Walker et al. | |
| 7,874,908 | B2 | 1/2011 | Walker et al. | |
| 7,887,414 | B2 | 2/2011 | Walker et al. | |
| 7,905,774 | B2 | 3/2011 | Walker et al. | |
| 7,905,775 | B2 | 3/2011 | Walker et al. | |
| 7,914,375 | B2 | 3/2011 | Walker et al. | |
| 7,934,990 | B2 | 5/2011 | Walker et al. | |
| 7,955,169 | B2 * | 6/2011 | Walker et al. | 463/16 |
| 7,955,171 | B2 * | 6/2011 | Jorasch et al. | 463/20 |
| 8,012,013 | B2 * | 9/2011 | Walker et al. | 463/21 |
| 8,105,156 | B2 * | 1/2012 | Walker et al. | 463/25 |
| 8,231,456 | B2 * | 7/2012 | Zielinski | 463/25 |
| 8,277,309 | B2 * | 10/2012 | Walker et al. | 463/25 |
| 8,287,366 | B2 * | 10/2012 | Olive | 463/26 |
| 8,376,836 | B2 * | 2/2013 | Baerlocher et al. | 463/25 |
| 8,403,748 | B2 * | 3/2013 | Anderson et al. | 463/31 |
| 8,444,483 | B2 * | 5/2013 | Anderson et al. | 463/25 |
| 8,444,493 | B2 * | 5/2013 | Anderson et al. | 463/42 |
| 8,628,405 | B2 * | 1/2014 | Gelber et al. | 463/25 |
| 2001/0031654 | A1 | 10/2001 | Walker et al. | |
| 2002/0058542 | A1 | 5/2002 | Roethel et al. | |
| 2002/0125641 | A1 | 9/2002 | Moody | |
| 2002/0147040 | A1 | 10/2002 | Walker et al. | |
| 2002/0155873 | A1 * | 10/2002 | Berman et al. | 463/16 |
| 2003/0027629 | A1 | 2/2003 | Pimienta | |
| 2003/0050806 | A1 * | 3/2003 | Friesen | G06Q 10/02 705/5 |
| 2003/0060276 | A1 * | 3/2003 | Walker et al. | 463/25 |
| 2003/0069056 | A1 * | 4/2003 | Cormack et al. | 463/16 |
| 2003/0069071 | A1 | 4/2003 | Britt et al. | |
| 2003/0073494 | A1 | 4/2003 | Kalpakian et al. | |
| 2003/0114217 | A1 * | 6/2003 | Walker | G07F 17/32 463/20 |
| 2003/0119579 | A1 * | 6/2003 | Walker et al. | 463/20 |
| 2003/0144053 | A1 | 7/2003 | Michaelson | |
| 2003/0148807 | A1 | 8/2003 | Acres | |
| 2003/0162588 | A1 | 8/2003 | Brosnan et al. | |
| 2003/0162589 | A1 | 8/2003 | Nguyen et al. | |
| 2003/0220138 | A1 | 11/2003 | Walker et al. | |
| 2004/0033826 | A1 * | 2/2004 | Berman | 463/16 |
| 2005/0079908 | A1 * | 4/2005 | Pacey | 463/20 |
| 2006/0035704 | A1 * | 2/2006 | Rush et al. | 463/25 |
| 2006/0252514 | A1 * | 11/2006 | Walker et al. | 463/25 |
| 2006/0281540 | A1 * | 12/2006 | Rush et al. | 463/25 |
| 2011/0059800 | A1 * | 3/2011 | Anderson et al. | 463/42 |
| 2011/0111844 | A1 * | 5/2011 | Anderson et al. | 463/27 |
| 2011/0130194 | A1 * | 6/2011 | Anderson et al. | 463/25 |
| 2011/0159948 | A1 * | 6/2011 | Anderson et al. | 463/25 |
| 2012/0028698 | A1 * | 2/2012 | Walker et al. | 463/20 |
| 2013/0203484 | A1 * | 8/2013 | Walker et al. | 463/25 |

OTHER PUBLICATIONS

"GameCast Live—PowerPoint Presentation", (http //www gamecastlive com/presentation/toronto2_files/frame htm), download date: Nov. 24, 2002, 12pp.

"GameCast Live—Press Release", (http //www gamecastlive com/ press_june_6 html), download date: Nov. 24, 2002, 2pp.

"Games—i2corp.com", (http //www i2corp com/games/index cfm), download date: Nov. 24, 2002, 2pp.

"MGAM Signs Agreement With Lac Vieux Desert Chippewa Tribe", Business Wire, May 18, 2001, 2pp.

"Multimedia Games, Inc.—Home", (http www betnet com/), download date: Nov. 24, 2002, 1pg.

(56) References Cited

OTHER PUBLICATIONS

"The Home Gambling Network—Players", (http //www homegamblingnetwork com/player php3), download date: Nov. 24, 2002, 2pp.
"The Home Gambling Network—Welcome", (http //www homegamblingnetwork com), download date: Nov. 24, 2002, 1pg.
"Welcome—i2corp.com", (http //www i2corp com/), download date: Nov. 24, 2002, 1pg.
"GameCast Live—About the Product", (http //www gamecastlive com/about_the product html), download date: Nov. 24, 2002, 1 pg.
Beckett, Rick, "Gambling Insurance?", iWon—Casino, (http //iwon gamblingtimes com/writers/rbeckett/rbeckett_winter2001 html), download date: Sep. 27, 2004, 2pp.
Brochure, "Flying Bet Roulette" DEQ Casinos Ltd., undated, 2pp.
Brochure: "Introducing iView", Bally Gaming Systems, Copyright 2004, 2pp.
Busch, Melanie, "Tulsa Firm Explores Internet Gaming", Tulsa World, Aug. 1, 1996, Section: Business, p. E1, 3pp.
Cave, Kathy, "The Lake Effect", Milwaukee Journal Sentinel, Mar. 27, 1996 at p. 8, 2pp.
Davy, K., "Big Ichigeki! Pachi-Slot Taikouryku Universal Museum—Reader Review", Copyright 1995-2001, Game FAQs, 2 pp.
Grochowski, John, "Computers Help Players Learn Winning Strategy", Chicago Sun-Times, Jun. 30, 1995, Section: Weekend Plus, Gaming, p. 13, NC, 2 pgs.
Grochowski, John, "Slot Tourney prospers under Indiana rules", Chicago Sun-Times, Apr. 6, 1997, Section: SHO, Casinos, p. 15, NC, 1 pg.
Hawley, David, "Those one-armed bandits; Slot machine tournaments lure throngs to Midwest casinos", The Houston Chronicle, Apr. 9, 1996, Section: Houston, p. 3, 3 pgs.
Mayo, Michael, "Win-Or-Lose-Cruise, You Can Bet Sports Legally Around Here—Just Wait Till the Boat Is 3 Miles Out", Sun-Sentinel, Dec. 28, 1994 at p. 1C, 3pp.
Pledger, Marcia, "Going for the gold at slot tournaments", Las Vegas Review-Journal, Dec. 24, 1995, p. 51., 4 pgs.
Ritchie, Lauren "Orange Man Sought in Betting Probe", Orlando Sentinel Tribune, May 30, 1990 at p. B2, 3pp.
"Station Announces Formation of GameCase Live, LLC and Release of Remote Play eSlots for In-Room Gaming Applications," PR Newswire, Jun. 6, 2001, Section: Financial News, 2 pgs.
Apr. 27, 2010 Office Action for U.S. Appl. No. 11/691,065.
Aug. 19, 2010 Office Action for U.S. Appl. No. 11/691,065.
Sep. 2, 2010 Office Action for U.S. Appl. No. 11/691,015.
U.S. Examiner's Notice of Allowability dated Aug. 10, 2001, U.S. Appl. No. 09/518,760, filed Mar. 3, 2001, 2 pages.
U.S. Examiner's Notice of Allowability dated Dec. 6, 1999, U.S. Appl. No. 08/880,838, filed Jun. 23, 1997, 1 page.
U.S. Examiner's Notice of Allowability dated Nov. 3, 2005, U.S. Appl. No. 10/985,131, filed Nov. 10, 2004, 6 pages.
U.S. Examiner's Notice of Allowability dated Sep. 28, 2006, U.S. Appl. No. 10/001,089, filed Nov. 2, 2001, 9 pages.
U.S. Examiner's Office Action dated Apr. 6, 2004, U.S. Appl. No. 10/001,089, filed Nov. 2, 2001, 10 pages.
U.S. Examiner's Office Action dated Jul. 11, 2005, U.S. Appl. No. 10/001,089, filed Nov. 2, 2001, 24 pages.
U.S. Examiner's Office Action dated Jun. 20, 2007, U.S. Appl. No. 11/423,037, filed Jun. 8, 2006, 15 pages.
U.S. Examiner's Office Action dated May 9, 2001, U.S. Appl. No. 09/518,760, filed Mar. 3, 2001, 10 pages.
U.S. Examiner's Office Action dated Oct. 6, 1999, U.S. Appl. No. 08/880,838, filed Jun. 23, 1997, 6 pages.
U.S. Examiner's Office Action dated Oct. 9, 2007, U.S. Appl. No. 10/636,520, filed Aug. 7, 2003, 21 pages.
U.S. Examiner's Office Action dated Sep. 12, 2003, U.S. Appl. No. 10/001,089, filed Nov. 2, 2001, 8 pages.
U.S. Appl. No. 08/766,576, entitled "Secure Improved Remote Gaming System", filed Dec. 6, 1996.
U.S. Appl. No. 09/218,258, entitled "System and Method for Automatically Initiating Game Play on an Electronic Gaming Device", filed Dec. 6, 1996.
Website: "Bettors Insurance", (http //www bettorsinsurance com/ index asp?asp?id=881035&), Copyright 2004, 1pg.
Website: "Cash Back Bonus", (http //www optimalgambling com/ casinos/cash-back-bonus-online-casinos htm), download date: Sep. 27, 2004, 1pg.
Website, "Extending the Casino Floor", GameCast Live, (http //www gamecastlive com/presentation/Toronto_files/slide0012 htm), download date: Jun. 6, 2001, 12 pgs.
Website: "Gamblers Insurance", (http www ul casino com/rules_ gamblers php), download date: Jul. 26, 2004, 1pg.
Website, GameCast Live—PowerPoint Presentation:, (http ///www gamecastlive com/preserntation/toronto2_files/frame htm), download date: Jan. 20, 2003, 12 pgs.
Website: "Guaranteed Play' is one product certain to grab attention from both casinos and their customers", DETNEWS/Casino Guide/ Grochowski, (http // info detnews com/casino/newdetails cfm? column=grochowski&myrec=358) download date: Jun. 9, 2008, 2pp.
Website: "Insuring Your Online Wagers", (http // www winneronline com/articles/November2001/gambling_insu . . . ), Nov. 28, 2001, 1 pg.
Website: "Online blackjack, poker, slots, and more—Casino Vegas Royale", (http www casinovegasroyale com/insurance shtml), Copyright 2002, 1pg.
Website: "Online Sports Betting—Sportsbet Bookmaker", (http //www sportsbetbookmaker com/aboutus shtml), download date: Jul. 27, 2004, 1pg.
Website: "SDS Product Group Snapshot", Bally Gaming Systems, (http www ballygaming com/sds/sds_products1 asp), download date: Aug. 9, 2004, 2pp.
Website: "Welcome—CasinoActive.Net Offers New Gambling Idea", (http //www bookmaker com/default asp?ACT=5&content=30&id= 1), download date: Jul. 26, 2004, 1pg.
Website: "Who Says You Can't Win From Losing? 49er and Three Diamonds Casino Offer 'Free Insurance' for Online Play in July", (http //www smartplayers net/insurance htm), Jun. 14, 2003, 1pg.

* cited by examiner

600

| | PLAYER IDENTIFIER 610 | NAME 620 | ADDRESS 630 | FINANCIAL ACCOUNT IDENTIFIER 640 | DEMOGRAPHIC 650 | CREDITS 660 | LIFETIME COIN IN 670 |
|---|---|---|---|---|---|---|---|
| 680 | P11123 | SAM BROWN | ANYPLACE, USA | 1111-1111-1111-1111 | MALE, AGE 23 | 68 AT $0.25 EACH | $600 |
| 685 | P222234 | LINDA JONES | SOMEPLACE, USA | 2222-2222-2222-2222 | FEMALE, AGE 47 | 0 | $14400 |

FIG. 6

700

| | GEMING DEVICE IDENTIFIER 710 | NAME 720 | MANUFACTURER 730 |
|---|---|---|---|
| 740 | G333333 | DIAMOND MINE | ABC CORP. |
| 745 | G444444 | CRAZY DEUCES | XYZ CORP. |

FIG. 7

800

895

| CONTRACT IDENTIFIER 810 | PLAYER IDENTIFIER 820 | INITIAL PLAYER BANKROLL 830 | DESCRIPTION 840 | COST 850 | RESULT 860 | AMOUNT OWED THE PLAYER 870 | AMOUNT OWED THE INSURER 880 |
|---|---|---|---|---|---|---|---|
| C111 | P222333 | N/A | 2000 PULLS, $0.25 PER PULL, PLAYER KEEPS NET WINNINGS | $20.00 | CONTRACT ENDS WITH PLAYER AT - $45 | 0 | $20.00<br>- $45.00<br>- $25.00 |
| C222 | P444555 | N/A | 1 HOUR OF PLAY, $1.00 PER PULL, PLAYER KEEPS GROSS WINNINGS | $100.00 | CONTRACT ENDS WITH PLAYER AT + $97 | $97 | $100.00 |
| C333 | P666777 | $2,000 | 1,000 PULLS PER WEEK, $2.00 PER PULL, OCCURRING BETWEEN 8-9PM TUESDAYS FOR 12 WEEKS OR UNTIL PLAYER LOSES BANKROLL | N/A | PLAYER LOST BANKROLL | 0 | N/A |
| C444 | P888999 | $100 | 90 MINUTES OF PLAY, $0.50 PER PULL | N/A | PLAYER ENDS UP WITH $120 | $120 | N/A |
| C555 | P111000 | $200 | $0.63 PER PULL, DOUBLE BETS FOR TWO PULLS AFTER ANY WIN, STOP AFTER JACKPOT, LOSS INSURED BEYOND $200 | $20.00 | 2 MINS. REMAINING, PLAYER AT + $213 | TBD | TBD |
| TOTAL OWED THE INSURER: $75.00 890 | | | | | | | |

FIG. 8

METHOD AND APPARATUS FOR EMPLOYING FLAT RATE PLAY

PRIORITY CLAIM

The present application is a divisional of, claims priority to and the benefit of U.S. patent application Ser. No. 11/428,642, filed on Jul. 5, 2006, which is a continuation of, claims priority to and the benefit of U.S. patent application Ser. No. 10/420,066, filed on Apr. 21, 2003, now U.S. Pat. No. 8,021,229, issued on Sep. 20, 2011, which claims the benefit of priority of and priority to U.S. Provisional Patent Application No. 60/374,385, filed on Apr. 19, 2002, the entire contents of each is incorporated by reference herein.

BACKGROUND

Gaming devices are very popular in the U.S. and abroad. Gaming devices, such as slot machines, video poker machines, video blackjack machines, video roulette machines, video kenos, and video bingo machines, provide casinos with the majority of their profits.

Consequently, it would be advantageous to improve the appeal of gaming devices and increase their usage by players.

BRIEF DESCRIPTION OF THE DRAWINGS

FIG. 6 is a table illustrating an exemplary data structure of a player database for use in the present invention.

FIG. 7 is a table illustrating an exemplary data structure of a gaming device database for use in the present invention.

FIG. 8 is a table illustrating an exemplary data structure of a contract database for use in the present invention.

DETAILED DESCRIPTION OF THE INVENTION

Applicants have recognized that it would be advantageous to keep players playing an appealing gaming device, rather than risk having such players stop playing and, e.g., play other gaming devices at competing locations.

Applicants have also recognized that players would find game play with a known up-front cost to be appealing, and such up-front costs and corresponding opportunity costs can be managed.

Applicants have also recognized that players would find longer play with generally lower up-front costs to be appealing.

In various embodiments of the present invention, a casino can significantly increase the usage of its gaming devices by retaining players and increasing average utilization of gaming devices. Moreover, a casino need not significantly alter its operations to do so.

In various embodiments of the present invention, a player may experience the excitement of a relatively large number of plays (outcomes) for a relatively low cost, and/or limit or eliminate his risk of losses.

In various embodiments of the present invention, a player need no longer be present at a gaming device to enjoy the gaming experience.

Several embodiments of the invention disclosed herein allow a player to make a relatively large number of plays at a gaming device for a relatively low price. For example, a player may pay in advance for a set of outcomes of the gaming device. The player would then receive a balance at the gaming device which could be used for outcomes, or plays. Such a balance might not be withdrawn as funds until, e.g., after at least a predetermined number of outcomes are generated by the gaming device.

In such an embodiment, amounts of wagers the player makes could be deducted from the balance, and amounts of winnings could be added to the balance. Once the player has finished the predetermined number of outcomes, the player could withdraw as funds ("cash out") the remaining balance. Alternatively, the player may receive some payment that is based on the remaining balance.

According to an embodiment, the player may continue to play even when the balance of the gaming device is zero or negative. If so, even if the balance is negative after the predetermined number of outcomes is generated, the player need not reimburse the gaming device for the "negative amount". Thus according to that embodiment, by purchasing the predetermined number of outcomes, the player enjoys the number of outcomes without the risk of any loss. The player need pay for only the cost of the predetermined number of outcomes.

Various other embodiments are described in detail herein, and still other embodiments will be apparent to those of skill in the art upon a review of the present disclosure.

Figure 1:
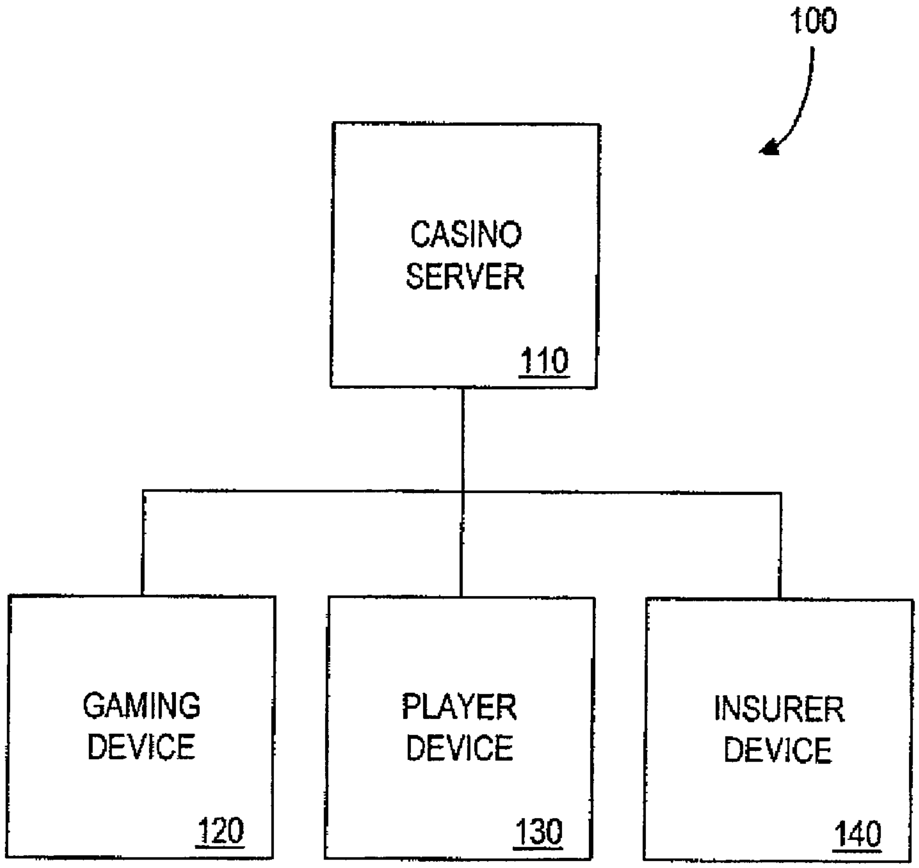
FIG. 1 is a block diagram of a system consistent with the present invention.

Referring now to FIG. 1, an apparatus 100 according to embodiments of the present invention includes a casino server 110 that is in communication with one or more gaming devices 120, one or more player devices 130, and one or more insurer devices 140. Each of the gaming devices, player devices and insurer devices may comprise computers, such as those based on the Intel® Pentium® processor, that are adapted to communicate with the casino server 110; portable types of computers, such as a laptop computer; a palm-top computer; a hand-held computer; or a Personal Digital Assistant (PDA). Other equivalent devices capable of performing the methods specified herein would be apparent to one of skill in the art.

Any number of gaming devices, player devices and insurer devices may be in communication with the casino server 110. The number of each depicted in FIG. 1 is solely for purposes of illustration.

The casino server 110 may communicate with the gaming devices, the player devices and the insurer devices directly or via a network, including without limitation the Internet, a wireless network protocol, a local area network (or any combination thereof), through a Web site maintained by casino server 110 on a remote server or over an on-line data network including commercial on-line service providers, and bulletin board systems. The casino server may communicate with the gaming devices, the player devices and the insurer devices directly or indirectly. In yet other embodiments, the devices may communicate with casino server 110 over radio frequency (RF), cable TV, satellite links and the like.

Those skilled in the art will readily understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The casino server 110 may function as a "Web server" that generates Web pages (documents on the Web that typically include an HTML file and associated graphics and script files) that may be accessed via the Web and allows communication with the casino server 110 in a manner known in the art.

FIG. 1 depicts only an embodiment of the invention. Other arrangements of devices to perform various methods specified herein will be readily appreciated by those of skill in the art.

Figure 2:
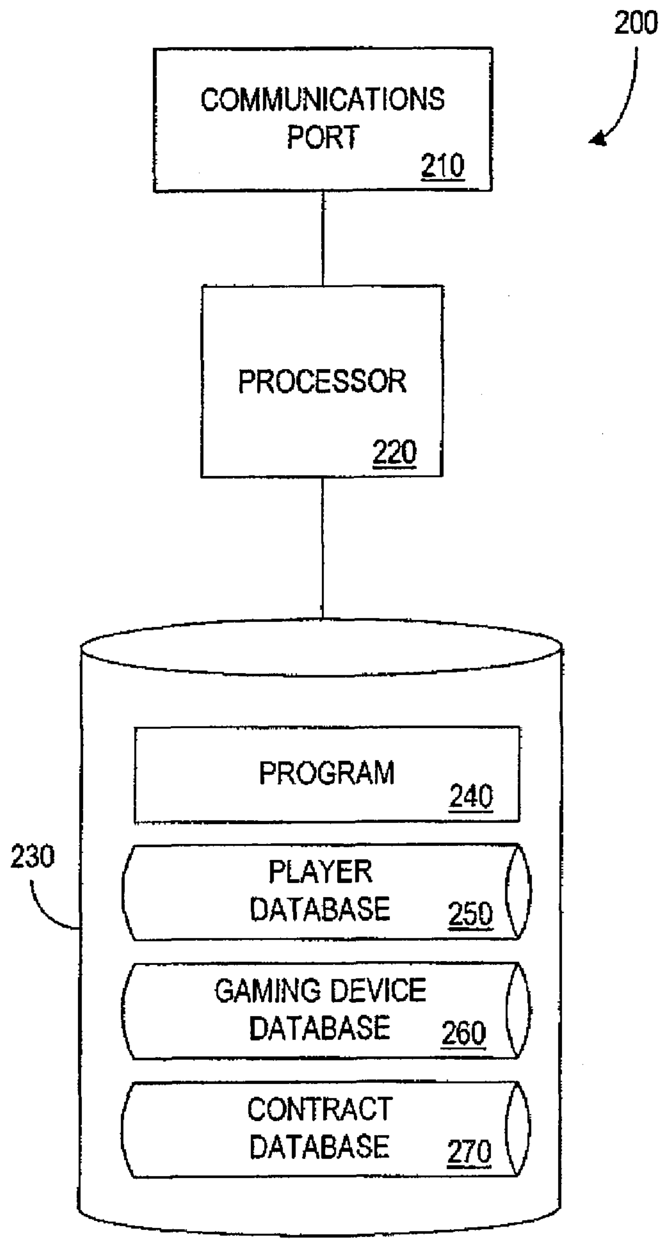
FIG. 2 is a block diagram of one embodiment of a casino server.

FIG. 2 illustrates an embodiment 200 of the casino server 110 (FIG. 1). The casino server 110 may be implemented as a system controller, a dedicated hardware circuit, an appropriately programmed general-purpose computer, or any other appropriate device including without limitation electronic, mechanical or electro-mechanical devices.

The server of the illustrated embodiment comprises a processor 210, such as one or more Intel® Pentium® microprocessors. The processor 210 is in communication with a communication port 220 and a data storage device 230. The communications port 220 allows the processor 210 to communicate with other devices, such as the insurer device 140. The data storage device 230 comprises magnetic memory, optical memory, semiconductor memory or any combination thereof. The data storage device 230 may include, for example, Random Access Memory (RAM), Read-Only Memory (ROM), a compact disc, digital video disc and/or a hard disk. The processor 210 and the storage device 230 may each be, for example: (i) located entirely within a single computer or computing device; or (ii) connected to each other by a remote communication medium, including without limitation a serial port cable, a telephone line, a network connection or a radio frequency transceiver. In some embodiments, the casino server 110 may comprise one or more computers that are connected to a remote server computer for maintaining databases.

The data storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format, as well as in a variety of other forms known in the art. The program 240 furthermore includes program elements that may be necessary, including without limitation an operating system, a database management system and "device drivers" for allowing the processor 210 to interface with peripheral devices. Appropriate program elements are well known to those skilled in the art, and need not be described in detail herein.

According to an embodiment of the present invention, the instructions of the program 240 may be read into a main memory from another computer-readable medium, such as into RAM from hard drive or ROM. Execution of sequences of the instructions in program 240 causes processor 210 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The storage device 230 also stores (i) a player database 250, (ii) a gaming device database 260, and (iii) a contract database 270. The databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein. Based on the present disclosure many other arrangements of data will be readily understood by those of skill in the art.

Figure 3:
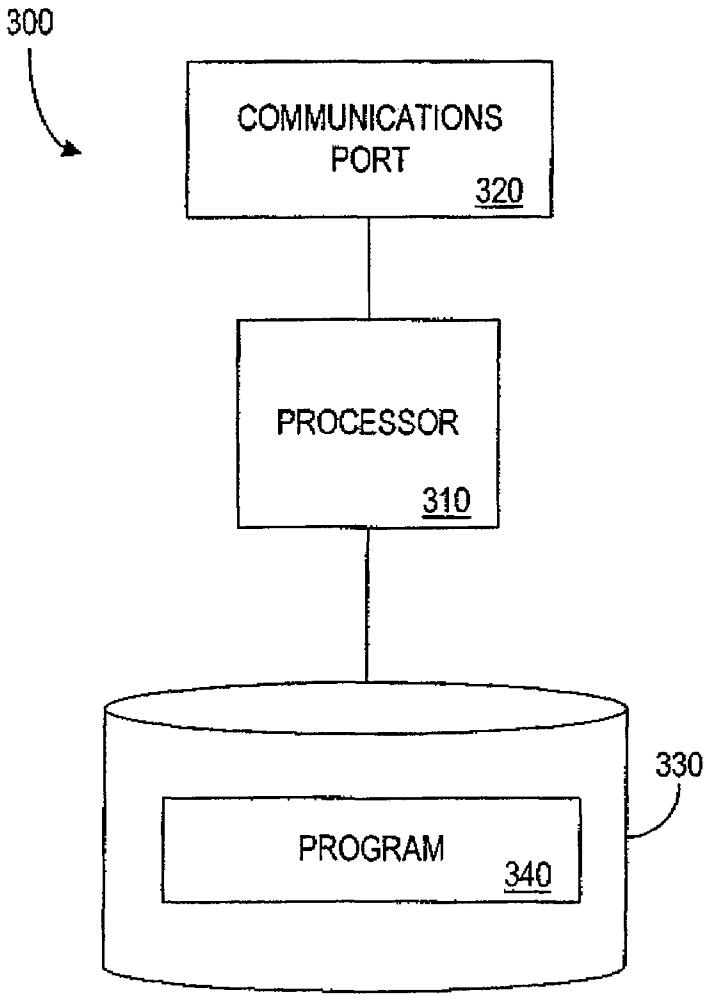
FIG. 3 is a block diagram of one embodiment of an insurer device.

FIG. 3 illustrates an embodiment 300 of an insurer device. The insurer device may be implemented as a dedicated hardware circuit, an appropriately programmed general-purpose computer, or any other appropriate device including without limitation electronic, mechanical or electro-mechanical devices. Accordingly, the insurer device need not include the various components depicted in FIG. 3.

The insurer device of the illustrated embodiment comprises a processor 310, such as one or more Intel® Pentium® microprocessors. The processor 310 is in communication with a communications port 320 and a data storage device 330. The communications port 320 allows the processor 310 to communicate with other devices, such as the casino server 110. The data storage device 330 comprises magnetic memory, optical memory, semiconductor memory or any combination thereof. The data storage device 330 may include, for example, Random Access Memory (RAM), Read-Only Memory (ROM), a compact disc and/or a hard disk. The processor 310 and the storage device 330 may each be, for example: (i) located entirely within a single computer or computing device; or (ii) connected to each other by a remote communication medium, including without limitation a serial port cable, a telephone line, a network connection or a radio frequency transceiver. In some embodiments, the gaming device may comprise one or more computers that are connected to a remote server computer for maintaining databases.

The data storage device 330 stores a program 340 for controlling the processor 310. The processor 310 performs instructions of the program 340, and thereby operates in accordance with the present invention, and particularly in accordance with the methods described in detail herein. The program 340 may be stored in a compressed, uncompiled and/or encrypted format, as well as in a variety of other forms known in the art. The program 340 furthermore includes program elements that may be necessary, including without limitation an operating system, a database management system and "device drivers" for allowing the processor 310 to interface with peripheral devices. Appropriate program elements are well known to those skilled in the art, and need not be described in detail herein.

According to an embodiment of the present invention, the instructions of the program 340 may be read into a main memory from another computer-readable medium, such as into RAM from hard drive or ROM. Execution of sequences of the instructions in program 340 causes processor 310 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

Figure 4:
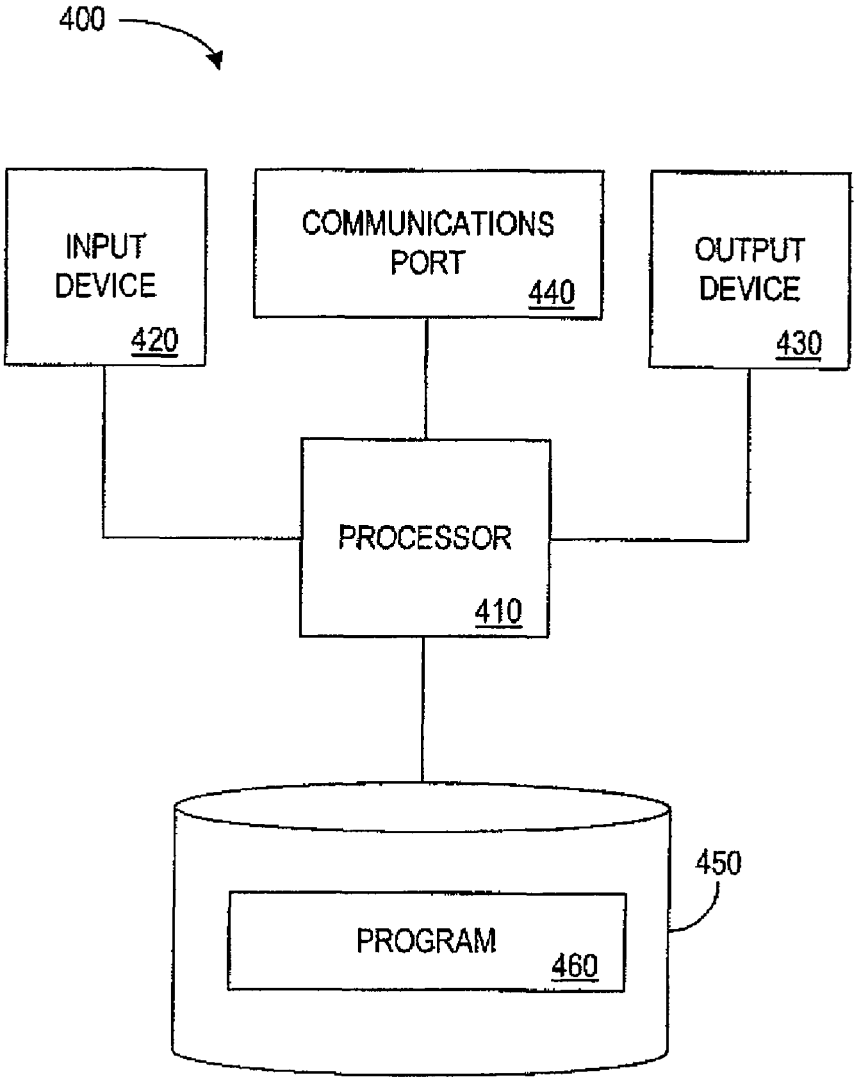
FIG. 4 is a block diagram of one embodiment of a gaming device.

FIG. 4 illustrates an embodiment 400 of a gaming device. Well-known examples of gaming devices include video poker, video blackjack, pachinko, mechanical slot machines and video slot machines. The gaming device may be implemented as a dedicated hardware circuit, an appropriately programmed general-purpose computer, or any other appropriate device including without limitation electronic, mechanical or electro-mechanical devices. Accordingly, the gaming device need not include the various components depicted in FIG. 4.

The gaming device of the illustrated embodiment comprises a processor 410, such as one or more Intel® Pentium® microprocessors. The processor 410 is in communication with a communications port 440 and a data storage device 450. The data storage device 450 comprises magnetic memory, optical memory, semiconductor memory or any combination thereof. The data storage device 450 may include, for example, Random Access Memory (RAM), Read-Only Memory (ROM), a compact disc and/or a hard disk. The processor 410 and the storage device 450 may each be, for example: (i) located entirely within a single computer or computing device; or (ii) connected to each other by a remote communication medium, including without limitation a serial port cable, a telephone line, a network connection or a radio frequency transceiver. In some embodiments, the gaming device may comprise one or more computers that are connected to a remote server computer for maintaining databases.

The data storage device 450 stores a program 460 for controlling the processor 410. The processor 410 performs instructions of the program 460, and thereby operates in accordance with the present invention, and particularly in accordance with the methods described in detail herein. The program 460 may be stored in a compressed, uncompiled and/or encrypted format, as well as in a variety of other forms known in the art. The program 460 furthermore includes program elements that may be necessary, including without limitation an operating system, a database management system and "device drivers" for allowing the processor 410 to interface with peripheral devices. Appropriate program elements are well known to those skilled in the art, and need not be described in detail herein.

According to an embodiment of the present invention, the instructions of the program 460 may be read into a main memory from another computer-readable medium, such as into RAM from hard drive or ROM. Execution of sequences of the instructions in program 460 causes processor 410 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The processor 410 may also be in communication with one or more input devices 420 and one or more output devices 430.

Examples of input devices include: a button; a touch screen; a handle; a player tracking card device, which performs functions related to player tracking cards, such as reading player tracking cards and communicating information read from such cards to the processor 410 (Typically, information read from such cards includes unique player identifiers, such as a sequence of digits or a sequence of alphanumeric characters); a ticket reader, which is capable of reading tickets and particularly indicia registered on tickets and like material; a credit card reader which generally allow a card such as a credit card or debit card to be inserted therewithin and information to be read therefrom.

Examples of output devices include: a cash dispenser, which dispenses coins and/or bills to players that have requested to have funds be dispensed; a ticket printer, which may be commanded to print onto a substrate, such as paper or other material; a display screen, such as a liquid crystal display, a plasma display and a video display monitor.

Figure 5:
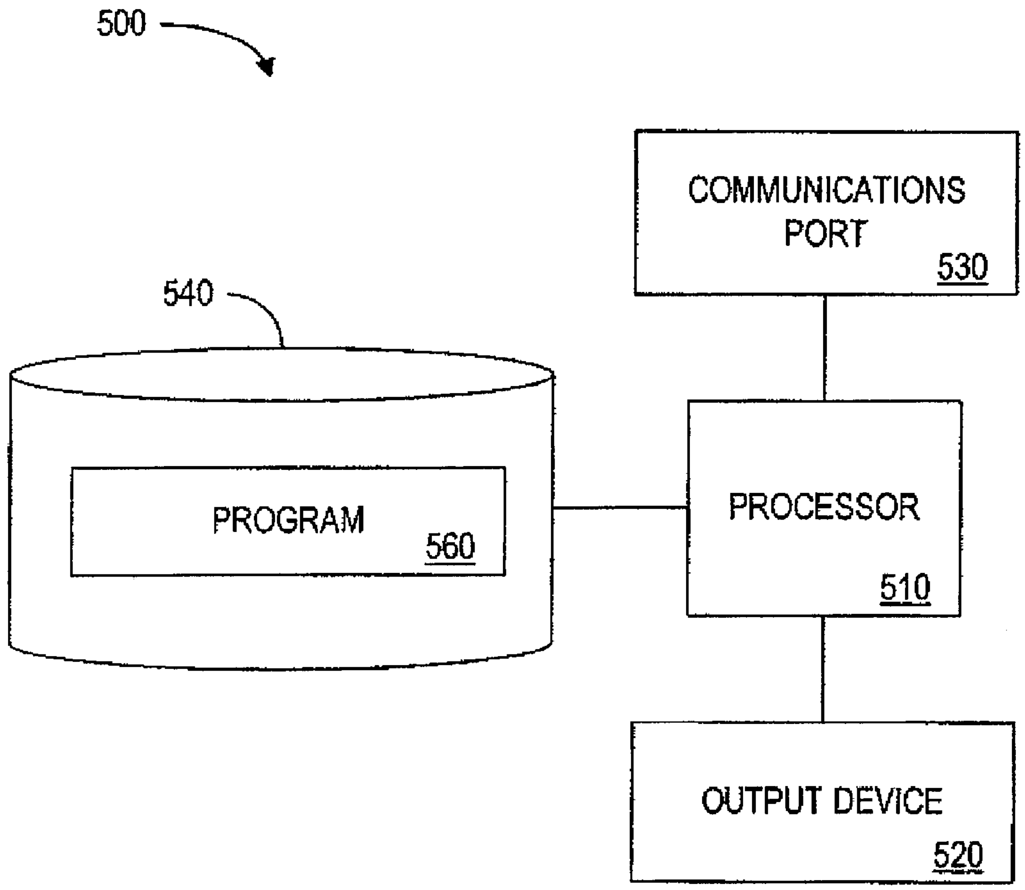
FIG. 5 is a block diagram of one embodiment of a player device.

FIG. 5 illustrates an embodiment 500 of a player device, which may, for example, a TV or a personal computer. The player device may be implemented as a dedicated hardware circuit, an appropriately programmed general-purpose computer, or any other appropriate device including without limitation electronic, mechanical or electro-mechanical devices. Accordingly, the player device need not include the various components depicted in FIG. 5.

The gaming device of the illustrated embodiment comprises a processor 510, such as one or more Intel® Pentium® microprocessors. The processor 510 is in communication with a communications port 530 and a data storage device 450. The data storage device 540 comprises magnetic memory, optical memory, semiconductor memory or any combination thereof. The data storage device 540 may include, for example, Random Access Memory (RAM), Read-Only Memory (ROM), a compact disc and/or a hard disk. The processor 510 and the storage device 540 may each be, for example: (i) located entirely within a single computer or computing device; or (ii) connected to each other by a remote communication medium, including without limitation a serial port cable, a telephone line, a network connection or a radio frequency transceiver. In some embodiments, the player device may comprise one or more computers that are connected to a remote server computer for maintaining databases. The data storage device 540 stores a program 560 for controlling the processor 510. The processor 510 performs instructions of the program 560, and thereby operates in accordance with the present invention, and particularly in accordance with the methods described in detail herein. The program 560 may be stored in a compressed, uncompiled and/or encrypted format, as well as in a variety of other forms known in the art. The program 560 furthermore includes program elements that may be necessary, including without limitation an operating system, a database management system and "device drivers" for allowing the processor 510 to interface with peripheral devices. Appropriate program elements are well known to those skilled in the art, and need not be described in detail herein.

According to an embodiment of the present invention, the instructions of the program 560 may be read into a main memory from another computer-readable medium, such as into RAM from hard drive or ROM. Execution of sequences of the instructions in program 560 causes processor 510 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The processor 510 may also be in communication with one or more output devices 520.

Examples of output devices include: a ticket printer, which may be commanded to print onto a substrate, such as paper or other material; a display screen, such as a liquid crystal display, a plasma display and a video display monitor.

Player Database

FIG. 6 is a tabular representation 600 of the player database. The tabular representation 600 of the player database includes a number of example records or entries 680 and 685 each defining a player. Those skilled in the art will understand that the player database may include any number of entries. The tabular representation 600 also defines fields for each of the entries or records. The fields specify: (i) a player identifier 610 that uniquely identifies the player; (ii) a name 620 of the player; (iii) an address 630 of the player; (iv) a financial account identifier 640 of the player, which may be, e.g., a credit card, debit card or checking account number; (v) demographic data 650 about the player, such as the age, gender, income level of the player; (vi) credits 660 which the player has accumulated in one or more previous and current plays at one or more gaming devices; and (vii) an indication of the aggregate amount 670 that the player has ever wagered, or that the player has ever deposited in a gaming device or made available for wagering at a gaming device.

Not all of the fields depicted in FIG. 6 are required, and various substitutions, deletions and other changes to the tabular representation will be readily apparent to those of ordinary skill in the art.

Gaming Device Database

FIG. 7 is a tabular representation 700 of the gaming device database. The tabular representation 700 of the gaming device database includes a number of example records or entries 740 and 745, each defining a gaming device. Those skilled in the art will understand that the gaming device database may include any number of entries. The tabular representation 700 also defines fields for each of the entries or records. The fields specify: (i) a gaming device identifier 710 that uniquely identifies the gaming device; (ii) a name 720 of the gaming device, which may additionally or alternatively specify the type of game(s) playable at the gaming device; and (iii) a manufacturer 730 of the gaming device.

Not all of the fields depicted in FIG. 7 are required, and various substitutions, deletions and other changes to the tabular representation will be readily apparent to those of ordinary skill in the art.

Contract Database

FIG. 8 is a tabular representation 800 of the contract database. The tabular representation 800 of the contract database includes a number of example records or entries such as the entry 895. Each record defining a contract that a player may agree to, and which may govern play at a gaming device accordingly. Those skilled in the art will understand that the contract database may include any number of entries. The tabular representation 800 also defines fields for each of the entries or records. The fields specify: (i) a contract identifier 810 that uniquely identifies the contract; (ii) a player identifier 820 that uniquely identifies a player who has agreed to the terms of the contract; (iii) an initial player bankroll 830 which sets forth the required initial amount, if any, which the player must provide; (iv) a description 840 of the contract; (v) a cost 850 which describes the cost, if any, of the contract to the gaming device (for e.g., its operator/owner); (vi) a result 860 at the end of the contract period, including, e.g., what amounts are owed to/by whom; (vii) an amount 870 owed to the player at the end of the contract; (viii) an amount 880 owed to the insurer at the end of the contract.

The tabular representation 800 of the contract database also may indicate a total amount 890 owed to the insurer, which may be calculated as the sum of the amounts 880 for all records.

Not all of the fields depicted in FIG. 8 are required, and various substitutions, deletions and other changes to the tabular representation will be readily apparent to those of ordinary skill in the art.

Figure 9:
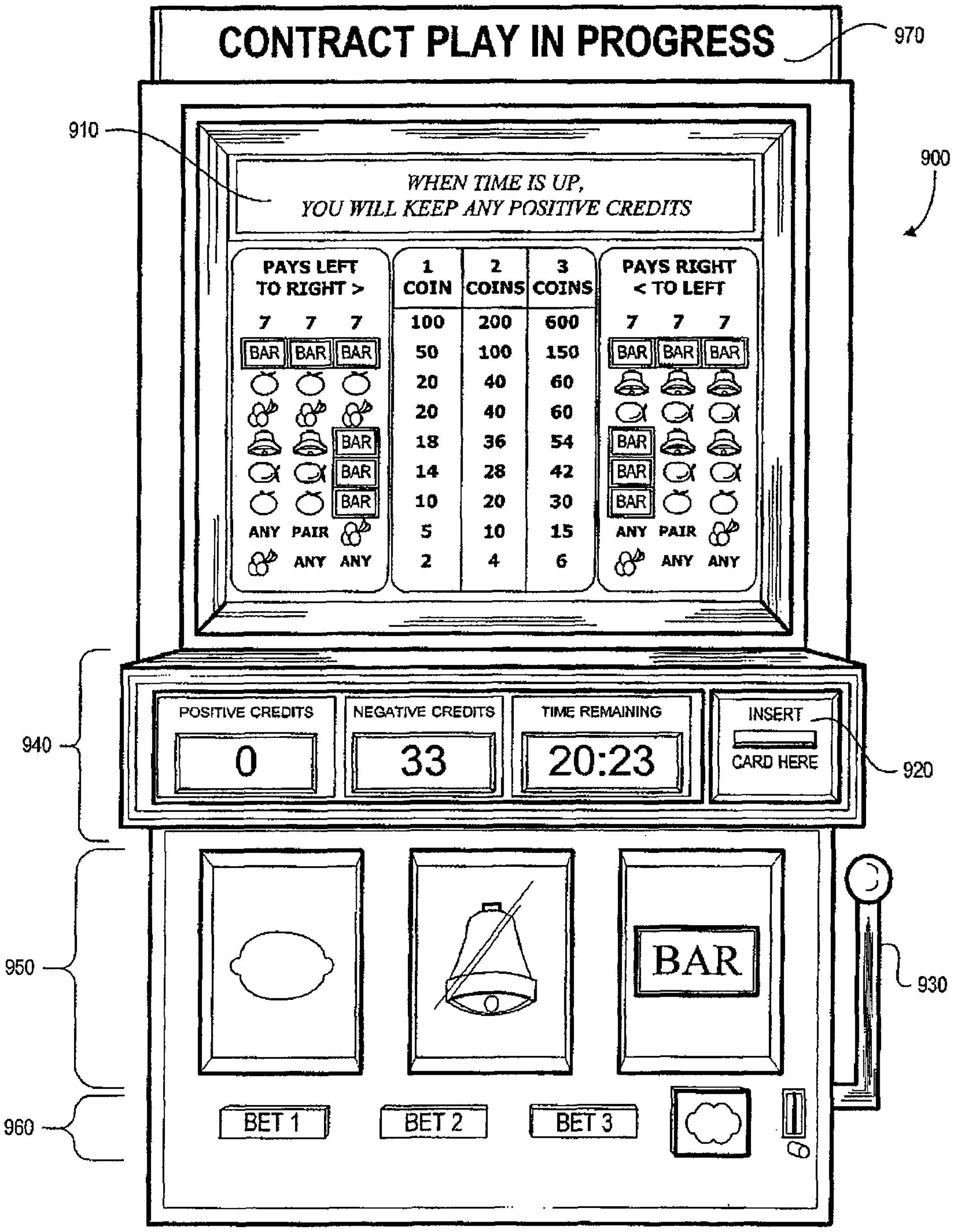
FIG. 9 is a front planar view of an illustrative gaming device, according to one embodiment.

Referring to FIG. 9, an illustrative gaming device 900 includes an information area 910, which displays a message to the user that, at the end of the contract, positive credits may be withdrawn by the player. Gaming device 900 also includes a card reader 920 for reading, e.g., player tracking cards. A handle 930 is used for initiating plays, in a manner known in the art. A display area 940 provides information, such as a positive credit balance (e.g., what credits may be withdrawn by the player as funds), a negative credit balance (e.g., what amounts have been lost but need not be repaid by the player) and a time remaining (e.g., for play according to the terms of a contract as described herein).

Reels 950 display the outcome of a play in the form of a reel symbol on each reel. Buttons 960 allow the player to indicate wager amounts for an outcome. An indicator 970 indicates whether a contract is in force and play must proceed under the terms of a contract.

Figure 10:
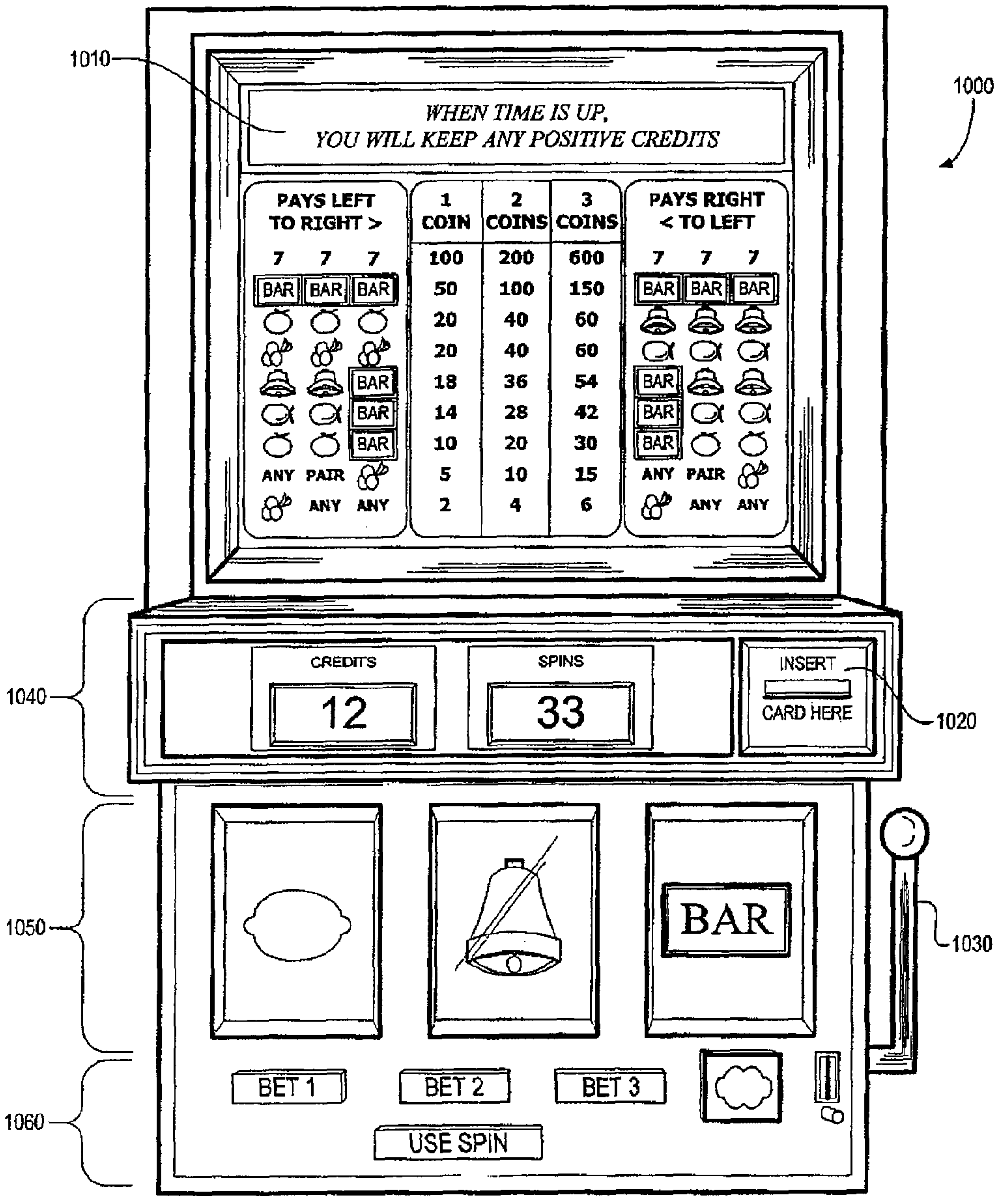
FIG. 10 is a front planar view of another illustrative gaming device, according to one embodiment.

Referring to FIG. 10, another illustrative gaming device 1000 includes an information area 1010. Gaming device 1000 also includes a card reader 1020 for reading, e.g., player tracking cards. A handle 1030 is used for initiating plays, in a manner known in the art. A display area 1040 provides information, such as a credit balance and a number of spins (i.e. plays or outcomes) remaining (e.g., for play according to the terms of a contract as described herein).

Reels 1050 display the outcome of a play in the form of a reel symbol on each reel. Buttons 1060 allow the player to indicate wager amounts for an outcome, and a "USE SPIN" button allows the player to indicate when another of the remaining spins (i.e. plays) is to be used.

Process Description

In general, a method according to an embodiment of the present invention allows payment to be received from a player in exchange for a predetermined number of outcomes at a player device (such as a gaming device, television, web terminal, etc.). The predetermined number may be expressed as a number, or in terms of a combination of a minimum time (e.g., an hour) and minimum rate of play (no less than six plays per minute).

Further restrictions of a like nature may be that the player may not receive more than a maximum number of outcomes, the player must play for a certain minimum time period, the player must play for less than a certain maximum time period, the player must maintain a minimum rate of play, the player may not exceed a maximum rate of play, the total amount of funds inserted for use in game plays ("coin in") over the duration of the contract must exceed a certain minimum amount, and the total coin in over the duration of the contract must not exceed a certain amount.

Further restrictions of a like nature may be that the player may not receive more than a predetermined number of winning outcomes, the player may not receive more than a predetermined umber of particular outcomes, the player may not receive more outcomes until a condition is met.

The player device generates at least the predetermined number of outcomes, and adjusts a balance of the player device based on the outcomes. Generally, the balance is increased according to winning outcomes and decreased according to wager amounts and (in some embodiments) losing outcomes. The player may be allowed to play, regardless of whether the balance decreases below zero.

In some embodiments, there may be established an agreement between a player, an insurer, and/or a casino. Terms of such a contract may include any or all of the following:

1. The player pays the insurer a fixed amount in advance.

2. The player must make a predetermined number of plays or outcomes (perhaps no more as well as no less).

3. The player need not pay any additional money after purchasing the contract.

4. The player keeps any net winnings after all outcomes have been generated.

5. If the player has a net loss (e.g., negative balance) after the outcomes have been generated, then the loss is paid to the casino by the insurer.

Many variations of these terms and additional terms will be readily apparent and many are further discussed in detail herein. The contract can serve to insure a player against excessive losses, and may give the player more outcomes than would otherwise be possible for the price of the contract. For example, a player wishing to make six hundred plays at a quarter slot machine would ordinarily require \$150 (25 cents×600) in order to assure himself the ability of completing the six hundred plays. However, a contract might allow a player to make six hundred plays by paying only, e.g., \$20.

Also, in some embodiments since there might be no additional player decisions required after the player has purchased the contract. For example, the player may not need to be present for the execution of the contract (plays) and may therefore experience the feeling of remote gambling.

Figure 11:
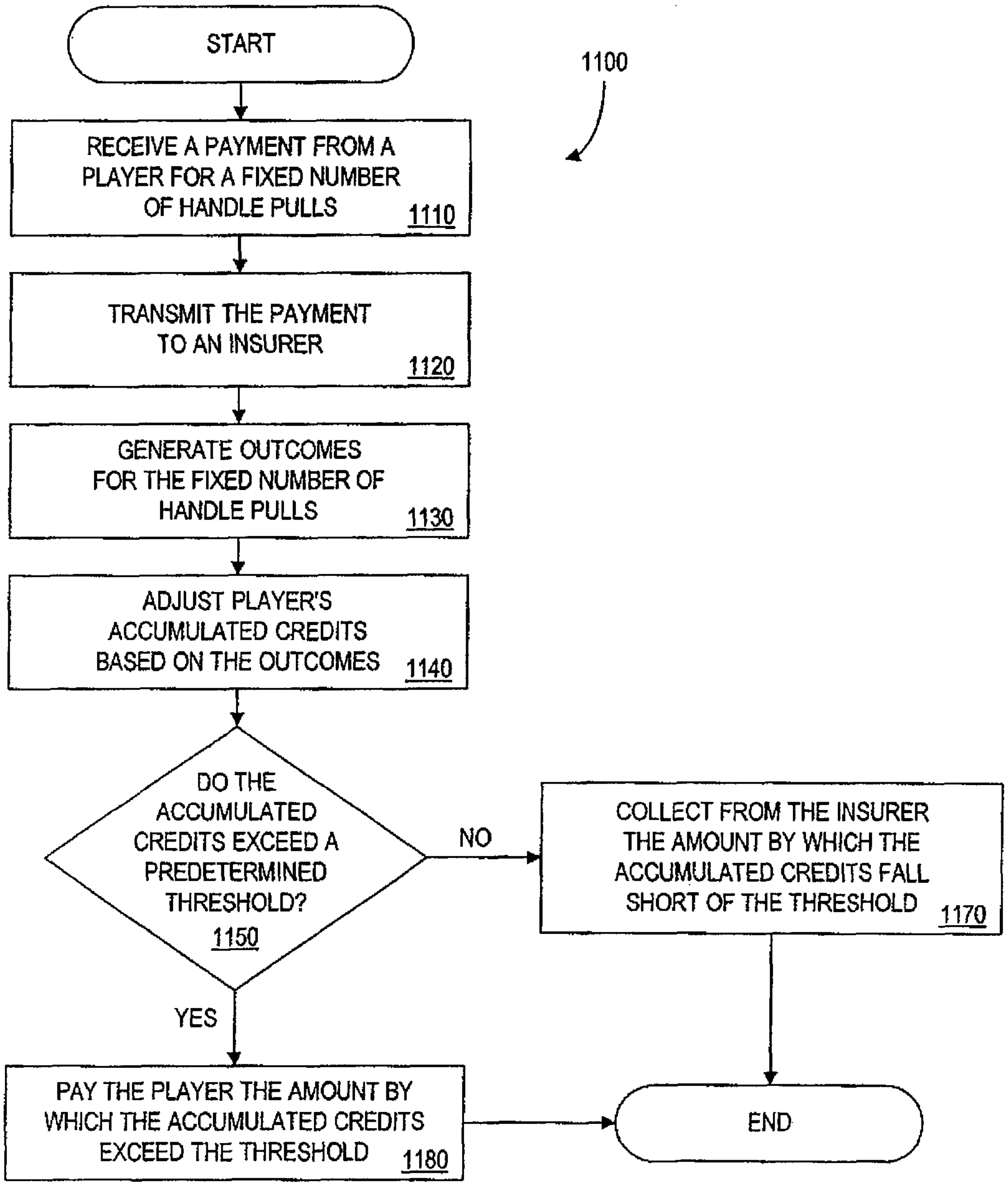
FIG. 11 is a flow chart illustrating an exemplary process according to an embodiment of the present invention.

Referring to FIG. 11, a flow chart 1100 represents an embodiment of the present invention that may be performed by a gaming device and/or the casino server 110 (FIG. 1) to execute in accordance with a contract. The particular arrangement of elements in the flow chart of FIG. 11, as well as the other flow charts and processes discussed herein, is not meant to imply a fixed order to the steps; embodiments of the present invention can be practiced in any order that is practicable.

At step 1110, a gaming device receives a payment from a player for a predetermined number of handle pulls (or other indications of an outcome). Typically, the payment is inserted into the gaming device as tokens, coins and/or bills. At step 1120, the payment is transmitted to an insurer, typically via an insurer device.

At step 1130, the gaming device generates a number of outcomes sufficient to satisfy the predetermined number of handle pulls required by the terms of the contract. At step 1140, the credit balance is adjusted according to these outcomes, typically by increasing the balance for winning outcomes and reducing the balance for losing outcomes. As is well known, the adjusting of a balance typically occurs after each outcome, but may occur at other times.

In the depicted embodiment, if the accumulated credits of the credit balance exceed a predetermined threshold (step 1150) then the player is paid the amount by which the accumulated credits exceed that threshold (step 1180). Otherwise, the amount by which the accumulated credits fall short of that threshold are collected from the insurer (step 1170).

In some embodiments, the contract does not involve an insurer at all. The contract may merely allow outcomes to be generated for the player while the player is not physically present at the gaming device. In such an embodiment, the contract define instructions from the player as to how the slot machine should play on the player's behalf. For example, the instructions will tell the machine how fast to play (e.g., outcomes per minute), when to quit (e.g., when the balance is less than twenty credits), and then where to send winnings (e.g., to a hotel bill, to a bank account).

Further variations in the terms of the contract are contemplated. For example, a contract may specify the size of the wager for each pull. The wager size may be the same as that typically used by the gaming device. For example, if a player signs up for a contract at a quarter slot machine, the wager for each pull of the contract might be a quarter. If the slot machine has multiple slots, the wager for each pull might be a quarter, 50 cents, 75 cents etc. The contract may allow or may force the player to vary the wager from pull to pull.

One aspect of a contract may allow all play to occur in "credit mode." That is, the player need not physically insert money into the gaming device prior to each pull, and money needn't come out of the gaming device after a player win. Rather, a player's credit balance may be stored in a player database (FIG. 6) either in the gaming device or in the casino server. Every time the player then makes a handle pull, credits are deducted from the player's balance. Every time the player wins, credits are added to the player's balance. The player's credit balance can be displayed on the device so that the player may track his progress.

Since play may occur in credit mode, each wager might consist of coin denominations that are not standard for the gaming device. For example, a device that typically handles quarters may accept wagers of a nickel, of 40 cents, or even of 12½ cents.

The following are several examples which illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment of the present invention, a contract may describe some threshold of gross winnings (the total of a player's winning amounts during the duration of a contract, not subtracting amounts wagered by the player), net winnings (gross winnings minus amounts wagered by the player), or accumulated player credits above which the player keeps any excess. Gross winnings describe the accumulated player wins from each pull of the contract. Thus, a player who makes 600 pulls on a \$1 slot machine as part of a contract and wins \$3 on each of 100 pulls has gross winnings of \$300 (\$3/pull×100 pulls). Net winnings are the gross winnings minus the accumulated costs of wagering. In the above example, the accumulated costs of wagering are \$600 (\$1/pull×600 pulls). Thus, in the above example, the player's net winnings would be negative \$300 (\$300−\$600). Accumulated player credits may mirror a running tally of a player's net winnings. For example, a player may begin with zero credits, with credits deducted in the amount of any wager, and added in the amount of any winnings. Accumulated player credits may also mirror a running tally of gross winnings, or any other statistic about a player's performance.

At the end of a contract, a player's accumulated credits may be compared to a threshold. The player may then receive a payout of any excess accumulated credits above the threshold. For example, if the threshold is zero, and the player has 44 credits, each credit representing 25 cents, then the player receives a payout of $11 (44 credits×25 cents/credit). If the player had −12 credits, indicating a net loss of 12 credits, then the player receives nothing. The player does not owe $3 because the contract does not make the player responsible for any losses.

The threshold might be at, e.g., ten credits, in which case a player with accumulated credits of thirty would receive a payout equivalent to twenty credits at the end of a contract, and a player with six credits would receive nothing. Further, with a threshold of negative ten credits, a player with accumulated credits of negative six would receive the equivalent of four credits, while a player with negative one hundred credits would receive nothing.

Rather than insuring against all of a player's losses, a contract might insure all losses up to a point and not beyond. Therefore, a contract may have multiple thresholds, each with different functions. A player may, for example, be responsible for any losses beyond a threshold loss of 100 credits. The same player might receive any winnings beyond a threshold of 10 accumulated credits. Thus, if, at the end of the contract, the player has accumulated −125 credits, then the player must pay 25 credits. If the player has accumulated 33 credits, then the player receives a 23 credit payout. If the player has accumulated −49 credits, then the player neither owes nor receives anything.

In some embodiments, a threshold delineates a change in the percentage of a player's winnings or losses between credit tallies above and below the threshold. For example, a player might keep any credits won beyond a threshold of 50. Below 50 credits, the player only keeps 80% of his winnings. Therefore, if a player has 70 credits remaining at the end of a contract, he keeps all 20 credits above 50, and he keeps an additional 40 credits, representing 80% of the first 50 credits. Therefore, the player keeps 60 credits in total.

A player may also be responsible for a percentage of losses above or below a certain threshold. For example, a player may be responsible for 50% of losses over 10 credits. Thus, a player who finishes a contract with minus 20 credits owes nothing for the first 10 credits of loss, but owes 5 credits for the next 10 credits of loss. The player therefore owes 5 credits.

In the most general sense, a contract specifies a functional relationship between what a player's accumulated credits are at the end of the contracted number of pulls, and what the player either owes or is due. The function may be piece-wise linear, or may be rather non-linear and convoluted.

Where there is potential for a player to owe money at the end of a contract, the player may be required to deposit money into the gaming device in advance so as to discourage the player from walking away when he owes money. The advance payment may later be returned if the player turns out to owe nothing at the end of the contract.

In many embodiments, a contract is "transparent" to the casino. In other words, if the player makes a certain number of handle pulls, the casino makes the same amount of money whether or not the player happened to be involved in a contract. In these embodiments, however, a casino may collect money that it makes (and the player has lost) from the insurer, rather than from the player. The casino may also act as an intermediary in transactions between the player and the insurer. For example, the casino may collect from the player money that is meant to pay for a contract. The casino may then transfer an equivalent amount of money to the insurer.

In other embodiments, a contract is not "transparent" to the casino. That is, the amount of money a casino receives after a certain number of the player's handle pulls may depend on whether or not the player was in a contract. In one example, a casino agrees that if a player's accumulated credits at the end of a contract are less than −200, then the casino will only collect 200 credits for the contract's handle pulls. This example may benefit the insurer, since the insurer doesn't have to worry about covering player losses in excess of 200 credits. In another example, the casino configures a gaming device to give different odds to a player in contract play versus a player not in contract play.

In one version of a contract, a player pays a fixed amount upfront, say $30. The gaming device then puts a credit balance on the gaming device. The credit balance may or may not be equal to the amount of money the player has paid upfront. In general, the player will not be allowed to cash out the credit balance until the end of the contract. Even then, the player may not receive the number of credits displayed on the credit balance. For example, the player may only receive the difference between the credit balance and a predetermined threshold.

During the course of the contract, the player may be allowed a fixed number of pulls, or a fixed amount of time in which to make as many pulls as he can. A player may receive some combination of a fixed amount of time and a fixed number of handle pulls, e.g., the player may make as many pulls as he can for the first hour, and then 100 pulls thereafter.

In this embodiment, each handle pull costs a credit, or costs multiple credits if the player plays multiple lines, or bets multiple credits per line. The credit or credits for the handle pull are deducted from the credit balance. If the handle pull results in the win of credits, such credits are added to the credit balance. Credits that are won typically do not go into the coin tray.

One aspect of this contract is that a player's credit balance may go negative. For example if a player has zero credits, and places a wager for a handle pull, then the credit balance goes to −1. Although a negative credit balance is not typical, all that it means, in this case, is that, during the contract, more credits have been deducted from the credit balance in order to initiate handle pulls than have been added to the credit balance as a result of winning handle pulls. This assumes, of course that the credit balance did not start out negative. The possibility of a negative credit balance provides an advantage for players in contract play. For one, a player can continue playing after his credit balance has gone to zero, without the need to insert new money. This is not the case in the typical course of play. Additionally, in many embodiments, the player will not be responsible for reimbursing the casino for a negative credit balance. Thus, in one sense, a player with a negative credit balance is playing for free.

Since it is unconventional for a slot machine to show a negative credit balance, several methods of doing so are described below:

A negative credit balance is indicated using a negative sign. For example negative 10 is written "−10".

A negative credit balance is indicated by enclosing the magnitude of the balance in brackets. For example, "(10)".

A negative credit balance is indicated by showing the magnitude of the balance, together with a red light, a border, text, or some other indicator of negativity. For example when a player has negative 10 credits, the gaming device may display "10" and additionally have a red light on. Alternatively, the gaming device may display "10" and backlight text which says, "Negative".

A negative credit balance is indicated in a different color than a positive credit balance. For example, a negative balance may be shown in red, and a positive balance in green.

A negative credit balance may be shown pictorially. For instance, a balance of negative 10 is shown as a hole 10 units deep, whereas a balance of positive 10 is shown as a pile 10 units high. A negative balance may also be illustrated as a number below a horizontal line, and a positive balance may be shown as a number above the horizontal line.

A negative credit balance may be shown as blinking, faded, italicized, in smaller font, etc.

A negative credit balance may be shown in a separate area or on a separate display from where a positive credit balance is shown. For example, a first LCD display is used for displaying the amount of any positive credit balance, and a second LCD display is used for showing the magnitude of any negative credit balance. When there is a negative credit balance, the display of the positive credit balance may read "0" or may simply be blank. Similarly, when there is a positive credit balance, the display of the negative credit balance may read "0" or may simply be blank. FIG. 9 illustrates a gaming device containing two displays for credit balances, one for a positive credit balance and one for a negative credit balance. In the figure, the player currently has −33 credits. The positive credit balance display reads, "0", and the negative credit balance display reads, "33".

The presence of negative credit balances may further necessitate arithmetic involving negative numbers. Such arithmetic may be confusing, especially when a player is not paying too much attention to his balances. At first glance, upon winning a 10-coin payout, a player with a negative credit balance might be surprised to see the magnitude of his balance going down, e.g., from −9 to −8, to −7, etc., even though he has won. A player may similarly be surprised to see his balance go from −6 to 4 upon the win of 10 coins. It might appear at first glance as if the player has lost 2 coins.

The presence of two separate balances may illustrate the player's standing in a convenient format. When a player with a balance of −6 wins 10 credits, his negative balance display is zeroed out, and then his positive balance display goes to 4. A player should then be less likely to experience confusion when a single balance appears not to change much, or appears to go in the wrong direction.

The pictorial display of negative balances may also help to alleviate confusion. When a player with a balance of −9 (a hole 9 units deep) wins a 20 coin payout, 20 bricks can be added to the pictorial display. The first 9 bricks fill in the hole, and the next 11 bricks stack on top of the filled hole. Thus, it appears that 20 units have been given to the player.

In one embodiment, when a payout will bring a player from being in the negative to being in the positive, the payout is made to the player with a distinct pause when the player's credit balance gets to zero. For example, a player with a balance of −6, who wins 10 credits, may first receive 4 credits. Then there may be a pause. Then the player may receive his last 6 credits. The pause gives the player time to adjust from seeing the magnitude of his negative balances decrease, to seeing his positive balance increase.

The gaming device may also accompany the payment of credits with a message. The message may say for example, "Paying back borrowed credits." Then once the negative balance has been zeroed out, a new message may appear, "Adding new credits," or something to that effect.

One way to handle confusion with negative credit balances is to try to avoid them entirely. In one variation of a contract, a player pays $50 to begin with. He then begins with a credit balance of 50. The player could just as easily begin with a different credit balance, but it may seem more fair to a player that he begin with a credit balance equal to the amount of money he has paid. Now, the contract specifies that after 400 pulls, the player will keep any positive credit balance remaining. In addition, the contract guarantees that the player will receive at least $30 back. So, if, at the end of the contract period, the player's credit balance is only $5, the player still gets back $30. The question is, why not just charge the player $20, let him start with a credit balance of 20, and allow him to keep the amount of any positive credit balance? The two contracts would be mathematically equivalent, as the player would not lose more than $20 in either case. However, the first contract has an advantage in that, by starting the player at 50 credits, the player is less likely to lose enough credits to go negative. By keeping a positive credit balance, the player is less likely to be confused with negative numbers and with negative arithmetic. The first contract also has another psychological advantage. Namely, the player will always get something back (i.e. his $30), whereas in the second contract, the player may get nothing back.

The first contract described above can be further sweetened by guaranteeing the player not only $30 of his $50 back, but also guaranteeing the player a coupon, voucher, or gift certificate for a product or service, the coupon having $20 face value. The player then perceives that he is guaranteed to recover the full amount of his payment, in the form of cash and other benefits, and has the further opportunity to win much more. The casino can afford to give away a $20 coupon, voucher, or gift certificate, because the casino may have excess inventory that it is willing to sell at a discount, may have high priced products for which a $20 discount would have little impact, may have products or services which cost it very little anyway, etc. Casino products or services may include nights at the casino's hotel, meals at the casino's restaurant, products from the casino's gift shop, tickets to the casino's show, etc. In addition, the coupon, voucher, or gift certificate may be provided by a third-party merchant. The merchant may be more than happy to give the player free or discounted products or services just to acquire the player as a customer. In fact, the merchant might even pay the casino to give away its certificates. The player, upon receiving such a certificate as a perceived recouping of his payment for the contract, will be very motivated to actually use it, thereby increasing the likelihood that the third party merchant would acquire a new customer.

With the use of coupons, vouchers, etc., a casino might also be able to justify starting a player at a credit balance below what the player has paid for the contract. For example, the player may pay $50 to enter into a contract where he starts at a $30 credit balance. The player may perceive this to be unfair, even though the fact that he cannot lose more than $50 within a large number of pulls confers upon him a significant advantage. Therefore, a contract may require a player to pay $50, but may provide a $20 gift certificate to the player, and start the player off at a $30 credit balance.

Of course, the starting amount of a player's credit balance, together with the face value of a gift certificate provided to the player, need not necessarily add up to the amount a player pays for the contract. For example, a player might pay $50, start with a credit balance of $40, and receive a $30 gift certificate. Similarly, a player need not be guaranteed to get back a value equal to what he paid initially. For example, a player may pay $50 to enter into a contract, and may be guaranteed a minimum of $20 back and a $20 gift certificate.

Returning to the subject of negative credit balances, another way to eliminate them is to change the rules of play once the player's credit balance gets to zero. In one embodiment, when the player's credit balance hits zero, normal play is halted and the player can only spin for the jackpot. Thus, a win of 10 coins does not increase the player's credit balance, and the cost of a handle pull does not decrease his balance. Rather, the only outcome that benefits the player is hitting the jackpot. If the player does hit the jackpot within the time or the pulls remaining in his contract, he may keep the jackpot. Otherwise, he will only receive a guaranteed minimum amount specified in his contract, e.g. $30. Of course, a player whose balance reaches zero may be allowed more outcomes than just the jackpot. For example, the player may be allowed to win any of the top three outcomes.

Still another way to handle negative credit balances, though the embodiment is not limited to negative credit balances, is to hide or obscure the amount of a player's credit balance. For example, rather than displaying to a player a numerical representation of his credit balance, the gaming device may instead display a shade of color. The shades of color may be approximately correlated to actual credit balances. For example, colors like violet and blue may be associated with high credit balances, while colors at the other end of the visible spectrum, such as red and orange, may represent relatively low credit balances. So, for example, if a player saw a color such as yellow, orange, or red displayed on his gaming device, he might realize that he was in the negative. However, he need never be confused with the presence of a negative sign, nor with changes from negative to positive numbers. It will be appreciated that there are many distinguishable gradations of color, brightness, hue, etc., each of which may be used to represent a credit balance. In addition, varying credit balances may be represented by progressively darker textures, by the position of a needle on a meter, by the angle of a dial, by the brightness of a light, by the pitch of a tone, by the loudness of a tone, etc. Another representation of a credit balance would be a pile of coins, diamonds or other items. Each coin in the pile might represent a credit, or a fraction of a credit. With a large number of coins piled together, the player would not be able to tell exactly how many coins were in the pile. Another representation of a credit balance involves a bag, such as a bag of money, that swells or shrinks depending on how much money is in the bag, equivalent to how many credits the player has left.

The concealment or obfuscation of the actual value of a player's credit balance may serve another purpose. Suppose that a player is engaged in a contract in which he will receive any positive credit balance remaining at the end of the contract. If the player's credit balance now reads −300, the player may become discouraged, feeling he has little chance to bring his credit balance back into the positive range. However, if the player's credit balance were represented by a shade of color, the player might not be so sure of how negative he was, and might become less discouraged. Another benefit of the concealment of a credit balance is that a player may, in good faith, represent to friends or family that he is "about even", since he would not necessarily be able to tell from the shade of his credit balance meter that he was down 10 coins. Therefore, the concealment of a credit balance can alleviate embarrassment. The concealment of a credit balance may also allow a player to postpone any anguish associated with losses. Until the player sees the actual amount of money that he has lost, he may maintain the illusion that his losses are not so bad. In this way he may better enjoy his experience. Note once again that the concealment of a credit balance need not occur only in the context of contract play. A player who plays in standard fashion may insert a $100 bill and begin with a green credit balance. The credit balance may change colors, moving up or down the visible spectrum, depending on how the player fares. Only if the player runs out or money may the gaming device actually reveal the player's credit balance, since, at that point, the player would no longer be able to continue spinning without inserting new money, and the illusion would be up. Also note that the player may always be given the option to see the exact amount of his credit balance. For example, at any time the player may press a "show balance" button, at which time his gaming device may switch the balance meter from displaying a color to displaying an actual number. Therefore, it may be completely up to a player as to whether he wants to maintain for himself any illusions about how much money he has won or lost.

In the context of the present embodiment, in which a player has a credit balance that can increase or decrease, and in which the player will keep the amount of any positive credit balance at the end of the contract period, some anxious situations may arise for the player. For example, the player might reach a point where his credit balance stands at 250, but where he has 300 pulls remaining in the contract. The player may be quite happy with his current credit balance, but worried that his credit balance will decrease significantly within the next 300 pulls. Therefore, in some embodiments, the player may take some measure to protect his current credit balance. For example, the player may signal to the gaming device that he does not want to receive less than his current credit balance at the end of his contract. As a result of the player's signal, the player may receive a minimum of his current credit balance at the end of a gaming contract, even if his balance ends up below its current level. If the player's credit balance rises above the level at which he sought protection, the player may receive the higher credit balance. Protecting a credit balance of a certain level will be termed "banking" at that level. For example, by banking a credit balance at a level of 100, a player ensures that he will receive the benefit of at least a 100-credit balance, whatever that benefit happens to be in the context of the contract.

A number of restrictions may apply as to when a player may bank, and as to the level at which a player may bank. Exemplary restrictions are listed below:

A player may only bank at a certain percentage of his current credit balance. The percentage might be 100%, 50%, 33%, etc., or even percentages above 100%. For example, if a player may only bank at 50% of his credit balance, then a player with a balance of 200 may bank at the 100 level.

The player may only bank a limited number of times during the course of a contract. For example, a player might be allowed to bank only once during a contract. The player would then be faced with a strategic decision as to when to bank. A player might bank at a level of 100 credits, but in doing so may lose the opportunity to bank at a later time, when he might bank at a higher level, and thereby protect a larger credit balance. On the other hand, if the player does not bank at a certain level, his credit balance may decline and he would not have the benefit of protection at the higher level.

The player may only bank within a given time period or within a given number of handle pulls of the start of a contract period. Similarly, the player might be allowed to bank only within a given time period or within a given number of handle pulls of the end of a contract period.

The player may only bank at a specific time, or set of times. For example, the player may only bank either 15 minutes, 30 minutes, or 45 minutes into a contract period, but at no other time. Similarly, a player might be allowed to bank only on specific handle pulls. For example, the player may only bank after the $100^{th}$, $200^{th}$, or $300^{th}$ spins, and at no other time.

The player may bank at only up to a maximum level. For example, no matter what his credit balance, a player may never bank at a level above 100.

In some embodiments, the ability to bank may be the only significant feature of a contract. For example, a contract may specify that a player can play for 100 pulls, using his own money to wager on each handle pull. At any point, the player may choose to bank his current winnings. Once the player has banked, he is effectively insured against any losses that go below the level at which he banked.

One version of a contract allows a player to initiate handle pulls without placing a wager and without having any amount deducted from his credit balance. In this way, over the course of a contract, a player's net winnings can only go up. For example, in a contract, a player may begin with a zero credit balance. The player may then be allowed 100 spins without placing any wagers. Any winning outcomes cause his credit balance to increase, while any non-winning outcomes do not affect his credit balance.

The expected size of a player's credit balance at the end of the contract described above may be readily calculated as the gaming device denomination multiplied by the payback percentage of the gaming device multiplied by the number of spins the player is allowed. Thus, if a $1 denomination gaming device pays back 95%, or an average of 95 cents for every dollar wagered, then the player's average balance after 100 spins would be $1×95%×100=$95. Therefore, the price that a player might have to pay to enter into such a contract would likely exceed $95. For example the player might pay the casino $98 to enter into a contract for 100 spins without having to pay for spins individually. As a result of the contract, the player would receive an average of $95, and therefore the casino would profit by an average of $3.

Examination of the formula for a player's expected winnings at the end of a contract where he does not wager prior to each spin, reveals that the player's expected winnings may be reduced if the payback percentage of the gaming device is also reduced. For example, if a $1 denomination gaming device paid back only 30%, then a player would make an average of $30 after 100 spins. Therefore, in one embodiment, a player may enter into a contract in which he does not pay for any wager, but in which the payback percentage of the gaming device is reduced from its typical value. The advantage for the player is that the price of the contract may be much smaller. Now, for example, rather than paying $98 to enter into a contract for 100 spins, the player need only pay $35 for a contract for 100 spins. The player gets the same amount of entertainment for a fraction of the upfront outlay. A further advantage of a contract at a gaming device with a reduced payback percentage, is that the payback percentage of a gaming device may be reduced by reducing the winnings paid for outcomes that the player regards as unimportant. For example, a player may not regard an outcome of "cherry-any-any", with a payout of $2, as very important, even though the outcome "cherry-any-any" makes up a significant portion of the payback percentage of the gaming device. Instead, the player may only be concerned with relatively high paying outcomes, such as jackpot outcomes. However, high-paying outcomes often make up a relatively small portion of a gaming device's payback percentage. Therefore, in one embodiment, the player may enter into a contract in which he does not pay for each spin during the contract, in which the payback percentage of the gaming device is reduced by reducing the payouts associated with low-paying outcomes, and in which the payouts associated with high paying outcomes are maintained. In one particular embodiment, a player may enter into a contract in which he may win only the jackpot on any spin.

Below is an example of the reduction of the payback percentage of a gaming device. In this example, the slot machine begins with the following payout structure, taken from "Winning At Slot Machines", by Jim Regan:

TABLE 1

| | Outcome | | | | | | | | | | | | | | | | | |
|---|---|---|---|---|---|---|---|---|---|---|---|---|---|---|---|---|---|---|
| | 0 | 2 | 2 | 5 | 5 | 5 | 20 | 10 | 10 | 20 | 14 | 14 | 20 | 18 | 18 | 20 | 50 | 100 |
| Hits | 8570 | 680 | 680 | 200 | 200 | 68 | 20 | 42 | 6 | 42 | 20 | 5 | 50 | 4 | 20 | 20 | 20 | 1 |

In the table, "Outcome" represents the number of tokens paid, and "Hits" represents the number of times the corresponding outcome would be expected to occur in 10,648 spins, or a complete cycle of the slot machine. The probability of each outcome occurring on a single spin can be found be dividing the "Hits" entry by 10,648. For example, the probability of the outcome that pays 100 tokens appearing on a single spin is $1/10{,}648 \approx 9.39*10^{-5}$.

If a player inserts a single token into the slot machine, his expected winning are given by:

$$EV = 0*8570/10{,}648 + 2*680/10{,}648 + 2*680/10{,}648 + 5*200/10{,}648 + \ldots + 100*1/10{,}648 \approx 0.945$$

Therefore, for every token the player inserts, he can expect to receive 0.945 tokens back, making for a payback percentage of 94.5%.

Suppose the payback percentage is reduced. The payouts of outcomes paying less than 20 are reduced to zero, while the payouts of outcomes paying 20 or more are kept the same. The payout structure now looks like the following:

TABLE 2

| | Outcome | | | | | | | | | | | | | | | | |
|---|---|---|---|---|---|---|---|---|---|---|---|---|---|---|---|---|---|
| | 0 | 0 | 0 | 0 | 0 | 0 | 20 | 0 | 0 | 20 | 0 | 0 | 20 | 0 | 0 | 20 | 50 | 100 |
| Hits | 8570 | 680 | 680 | 200 | 200 | 68 | 20 | 42 | 6 | 42 | 20 | 5 | 50 | 4 | 20 | 20 | 20 | 1 |

Now, if a player inserts a single token into the slot machine, his expected winnings are given by:

$$EV = 0*8570/10,648 + 0*680/10,648 + 0*680/10,648 + 0*200/10,648 + \ldots + 100*1/10,648 \approx 0.351$$

Therefore, for every token the player inserts, he can expect to receive 0.351 tokens back, making for a payback percentage of 35.1%. Of course, in the case of the contract under discussion, a player will not insert a token prior to every pull. However, he will still receive an average of 35.1 cents for every pull, or equivalently, an average of $35.10 after 100 pulls. Note how the payback percentage of the gaming device has been reduced from 94.5% to 35.1%, even though the probabilities of each outcome occurring have not changed, and the payouts for the six highest outcomes have not changed. If payouts for all the outcomes, except for the outcome paying 100, were reduced to zero, then the expected winnings on a single handle pull would be given by:

$$EV = 100*1/10,648 \approx 0.00939$$

Thus, the payback percentage would be less than 1%. Therefore, a player could purchase a contract for 100 spins for only $1, and the casino would still make a profit, on average.

In one embodiment, a player might have a choice of contracts where the gaming device has a different payback percentage in each. Each contract may allow the player a different number of spins, depending on what the payback percentage is. For example, for $100, a player might get 100 spins at 95% payback, 200 spins at 48% payback, or 300 spins at 32% payback.

One possible drawback of gaming devices with reduced payback percentages is that the player will likely not win very often. For example, with the payout structure described above, in which only the six highest paying outcomes continue to pay, the number of hits per cycle of winning outcomes would be: 20+42+50+20+20+1=153. With a cycle of 10648, the player would win an average of once every 10648/153 spins, or about once every 70 spins. In fact, in almost 24% (=((10648−153)/10648)$^{100}$) of contracts of 100 spins, the player would not win on any spin.

A player's frequency of obtaining winning outcomes may be increased, while maintaining a low payback percentage of a gaming device, if outcomes are introduced that take away from a player's credit balance. Such outcomes will be termed "negative outcomes", which are distinct from non-winning outcomes. Typically, at a gaming device, the only way for a player to lose money or to lose credits is to make a wager on a handle pull. If the handle pull is non-winning, then the player has lost the amount of his wager. However, no additional amounts are deducted from the player's credit balance. If the player has not paid for the wager in the first place, then a player would typically have no way of losing money on a handle pull, no matter what the outcome. Thus, negative outcomes are distinct from non-winning outcomes in that negative outcomes actually do cause a player to lose money from a credit balance. For example, a player might have a credit balance of 60, achieve a negative outcome of −15, and then have a credit balance of 45.

In one embodiment, negative outcomes cause a player to lose a fixed percentage of his credit balance. For example, a negative outcome may take away 50% of a player's credit balance. A player with a balance of 40, upon attaining such a negative outcome, would end up with a balance of 20. Negative outcomes may take away other percentages, such as 10%, 33.3%, 66.7%, 75%, or 100% of a credit balance. If a negative outcome would take away a fractional credit, then the number of credits to be taken may be rounded either in favor of the casino or in favor of the player. For example, if a player has a balance of 11, and he receives a negative outcome that takes away 50%, then the player may end up with either 5 or 6 credits, depending on the rules of rounding that are applied. One benefit of negative outcomes that take away a percentage of a player's credit balance, is that, so long as a player is not using up a credit to initiate each handle pull, the player's credit balance cannot go negative. For example, a player's credit balance may be cut in half 10 times in a row, but dividing a positive number by 2 will never make the number go negative. In some embodiments, however, a player's credit balance is allowed to go to zero. For example, a player with a single credit may go to zero if he gets a negative outcome that takes away 50% of a balance, even though fractional credits would normally be rounded in favor of the player.

The magnitude of a negative outcome may have a more complicated functional dependence upon a player's credit balance. For example, if the player's credit balance is 100 or less, then a negative outcome takes away 50% of the balance. However, if the player's credit balance is more than 100, the negative outcome takes away only 33% of the player's credit balance.

Negative outcomes may be depicted with the addition of new symbols to existing gaming devices. For example, "thief" symbols could be added to the reels of a gaming device. Then, a negative outcome would be indicated by the appearance of at least two thief symbols across a pay line. Alternatively, existing symbols of a gaming device could be used to indicate negative outcomes. For example an ordinarily meaningless symbol combination, such as lemon-bell-bar, might represent a negative outcome. In some cases, one or more blanks may represent a negative outcome.

The following example illustrates how the use of negative outcomes can allow a player to win more frequently, without changing the payouts of outcomes, and without altering the payback percentage of the gaming device. The payout structure of a typical slot machine, taken from "Winning At Slot Machines", is once again reproduced below:

TABLE 3

| | Outcome | | | | | | | | | | | | | | | | | |
|---|---|---|---|---|---|---|---|---|---|---|---|---|---|---|---|---|---|---|
| | 0 | 2 | 2 | 5 | 5 | 5 | 20 | 10 | 10 | 20 | 14 | 14 | 20 | 18 | 18 | 20 | 50 | 100 |
| Hits | 8570 | 680 | 680 | 200 | 200 | 68 | 20 | 42 | 6 | 42 | 20 | 5 | 50 | 4 | 20 | 20 | 20 | 1 |

The win frequency of a slot machine may be defined as the percentage of handle pulls in which the player can expect to achieve a winning outcome. The win frequency may be derived by summing the number of hits for a winning outcome that are contained within a cycle, by the total length of the cycle. In the case of the above payout structure, the win frequency is:

(#Hits for first outcome paying 2+#Hits for second outcome paying 2+ . . . +#Hits for outcome paying 100)/(Length of cycle)

$$= (680 + 680 + \ldots + 1) / 10648 \approx 19.5\%$$

Now, the above payout structure will be modified to include the addition of a negative outcome. The new payout structure is as follows:

TABLE 4

| | Outcome | | | | | | | | | | | | | | | | | | |
|---|---|---|---|---|---|---|---|---|---|---|---|---|---|---|---|---|---|---|---|
| | 0 | −10 | 2 | 2 | 5 | 5 | 5 | 20 | 10 | 10 | 20 | 14 | 14 | 20 | 18 | 18 | 20 | 50 | 100 |
| Hits | 3386 | 864 | 5000 | 680 | 200 | 200 | 68 | 20 | 42 | 6 | 42 | 20 | 5 | 50 | 4 | 20 | 20 | 20 | 1 |

The new payout structure includes a negative outcome that causes a player to lose 10 coins form his credit balance. Note also that the new payout structure allows the first outcome paying 2 to occur much more often than it had. The outcome now occurs on 5000 hits of the cycle, whereas previously it had occurred on just 680 hits of the cycle. The win frequency can be shown to have increase to approximately 60.1%. Meanwhile, the payback percentage of the gaming device has not changed. A payout structure such as the one above may prove to be more exciting to a player, since he now wins more often than he had with the original payout structure.

Note that the new outcome could also have been made, for example, a "lose 50% of your balance" outcome. Then, the above payout structure would be accurate only when the player had a balance of 20 coins. Otherwise, the gaming device would have a different payback percentage than 94.5%.

A potential drawback of contracts in which a player only wins money, and does not pay the cost of handle pulls, is that the player may accumulate money so rapidly that the contract must be priced very highly in order to assure a casino profit. Some remedies to this drawback have been described above. Another possibility is that a player must first transition into a state (i.e. a prequalification) in which he can win, before he is actually allowed to win. An analogy can be taken from the game of volleyball. In volleyball, the defending team may win the rally, but not score a point. As a result of winning the rally, the defending team gets the ball. Only when a team starts out with the ball can it actually score points. Similarly, on a gaming device, a player might first need to obtain a winning outcome, or some other outcome which transitions the player into a new state, where he can actually win credits. Then, if the player does not achieve a winning outcome, the player may exit the state in which he can win credits. In this way, the player's accumulation of money is greatly reduced.

In some embodiments, a period of time, or a number of pulls during which the player can only win, and in which pulls cost the player nothing, is provided to the player as a prize or reward. For example, the player may win a bonus outcome, which allows him to spin for two minutes, without inserting any new money, and keep any winnings from the two minutes. The two minutes of free spins may or may not be at a reduced payback percentage. In fact, they may be at an even higher payback percentage.

Taxes

In one embodiment, a player does not fully pay upfront for the benefits conferred by a contract. Rather the player may pay in the form of "taxes". Taxes are defined by rules that specify how to adjust a balance, such as how to deduct credits from a player's winning payouts, or from a player's credit balance under various circumstances. The following is a list of exemplary taxes:

1. The gaming device withholds from a player any payout that would bring a player's net winnings for a contract period above a predetermined threshold. For example, suppose a player has begun a contract period at a $1 gaming device by inserting a $50 bill and receiving therefore 50 credits. The player has been playing for 20 minutes, has been doing reasonably well, and now has a credit balance of 145. The player's net winnings for the contract period thus far are 145−50=95 credits, assuming the player has neither inserted new credits, nor cashed out any credits since beginning the contract period. Now, suppose that the gaming device has a rule in place whereby it withholds from a player any winnings that would bring a player's net winnings for a contract period over 100 credits. So, if the player with 95 credits in net winnings for the contract period now gets an outcome paying 15 credits, then the player may be paid only 5 of the credits, bringing the player's net winning to 100 credits. The other 10 credits are withheld by the gaming device, since payment of the 10 credits would bring the player's net winnings over 100 credits. Now, suppose that a player makes another $1 wager and loses on the next outcome. His credit balance decrements by one. His credit balance does not remain at 150, even though 5 credits had previously been withheld.

2. The gaming device limits the amount of a player's net winnings for a contract period to a predetermined number. With this tax, a player's balance may reflect net winnings exceeding the predetermined number. However, at the end of the contract period the player will only receive net winnings up to the predetermined number. For example, if the player ends a contract period with a balance reflecting net winnings of $200, and the gaming device has limited net winnings to $100 for a contract period, then the player may only receive $100 of his $200 in net winnings when he cashes out. If the player is not playing in credit mode, then the gaming device may simply not pay the player any winnings that would bring his net winnings for a contract period over the predetermined number. However, the player may receive a free spin for every credit that he was not paid.
3. The gaming device withholds a predetermined number of credits from any payout exceeding a certain threshold. For example, the gaming device withholds one credit on any payout of more than 4 credits.
4. The gaming device pays the player only the highest payout for any consecutive sequence of pulls in which the player has won some credits on each pull in the sequence. For example, suppose the player has made eight consecutive pulls with the following resulting payouts: 0, 10, 4, 0, 2, 5, 3, 0. The player would actually only be paid 10 coins in total for the second and third pulls, and 5 coins for the fifth, sixth, and seventh pulls. This is because the second and third pulls were consecutive pulls of winning outcomes. Therefore the player only gets the highest payout of the consecutive pulls, which is 10. Similarly, the highest payout from amongst the fifth, sixth, and seventh pulls is 5. Now in practice, when the player receives a winning outcome, the gaming device does not know whether the next outcome will also be a winning outcome. So the gaming device cannot know what to pay the player for the current sequence of winning pulls. Therefore, if the current payout is the first winning payout in a sequence, the gaming device may pay the player the full amount of the payout. If, however, the current payout is not the first winning outcome in a sequence, then there are two possibilities. In one possibility, the current payout is the highest payout thus far in the sequence, in which case the gaming device may pay the player the difference between the current payout and the next highest payout already to occur in the sequence. In the second possibility, the current payout is not the highest payout in the sequence, in which case the player may be paid nothing, or may have his wager returned, for a push. Going back to the first possibility, if the current payout is the highest payout in any sequence of winning outcomes, then the player may additionally be paid a single coin for every prior winning outcome present in the sequence, so as to convert such outcomes to pushes instead of losses for the player. In other variations of this tax, the player is paid only the highest n payouts in any sequence of winning outcomes. In still another variation, the player is paid only for the lowest winning outcome in any consecutive sequence of winning outcomes, or only for the median outcome, or only for the modal outcome.
5. The player is paid only for the first winning outcome in any sequence of consecutive winning outcomes. Subsequent winning outcomes in the sequence may be treated as pushes, or may be treated as losses. In other variations, the player is paid only for the second winning outcome in any consecutive sequence of winning outcomes, or only for the nth winning outcome in any consecutive sequence of n or more winning outcomes (here n is a natural number). In the latter variation, if a consecutive sequence of winning outcomes is less than n, then a player may be paid only for the last winning outcome, may be paid for every winning outcome, or may not be paid for any of the winning outcomes. In another variation, the player is paid only for the last winning outcome in any consecutive sequence of winning outcome. In still other variations the player is paid only for the first and second winning outcomes in any sequence of consecutive winning outcomes, or only for the mth and nth, outcomes, or only for any other combination of winning outcomes. In still other variations, the player is paid only for the first, last, or nth outcome in any sequence of outcomes in which no more than m outcomes are non-winning outcomes. There are many other possible variations to this tax.
6. The player is paid only for the best line in multi-line play. For instance, if the player has enabled three paylines on the gaming device, and the outcomes for lines 1, 2, and 3 pay 5, 9, and 0 coins, respectively, then the player only receives 9 coins, not 14 coins. In variations of this tax, the player is paid for the highest two lines, the highest 10% of lines, the median line, or the lowest line.
7. The gaming device withholds from the player a fixed percentage of any payout. For example, the gaming device withholds 5% of any payout. In many instances, the withholding of a percentage of a payout will result in the withholding of a fractional amount of a credit. For example, withholding five percent of a 10-coin payout equates to withholding one half of a credit. In some embodiments, the gaming device rounds any fractions of a credit withheld either up or down, depending on its rules of operation. Thus, even though the gaming device withholds 5% of payouts, the gaming device may withhold a full credit on a 10-coin payout after rounding up the half credit to a full credit. In another embodiment, the gaming device does not withhold fractional credit amounts, but rather keeps track of the fractional amounts of credits that would have been withheld from a player had they been whole credit amounts. Then, whenever the stored fractional amounts of credits add up to a full credit, the gaming device may withhold such a credit from the player. For example, on two consecutive pulls, a player wins 6 and then 14 credits. The gaming device pays the player six credits for his first payout, but also tracks the 5%*6 credits=0.3 credits that it would have withheld from the player. Then, when the player achieves the payout of 14 credits, the gaming device figures the withholding from the 14-credit payout as 5%*14=0.7 credits, adds the 0.7 credits to the 0.3 credits previously stored, and deducts the resultant full credit from the player's payout of 14, giving the player only 13 credits instead. Whenever the gaming device is tracking fractional amounts of credits to be withheld in the future, the gaming device may display such fractional amounts to the player.
8. The player receives only the highest payout in any sequence of two non-overlapping handle pulls. For example, the player only receives the highest payout from amongst the first and second handle pulls, and only the highest payout from amongst the second and third handle pulls. If the player achieves more than two winning outcomes in any designated group of handle pulls, then the lower of the winning outcomes may be treated as a push, and the player may receive his wager back for that handle pull. In variations of this tax, the player receives the highest n payouts in any sequence of m non-overlapping handle pulls. The player might also receive only the lowest payout, the lowest positive payout, the median payout, or the modal payout in any sequence.

9. The player receives only the highest payout in any sequence of two handle pulls. Note that sequences of handle pulls considered in this tax may overlap. For example, the sequence consisting of the first and second handle pulls overlaps with the sequence consisting of the second and third handle pulls. Thus if a player has a sequence of handle pulls resulting in payouts of, 0, 3, 8, 2, 0, 3, 5, 0, then the player receives 8 coins and 5 coins, for a total of 13 coins. The player receives nothing for the second or fourth pulls, because the third pull, which is in a sequence of two with both the second and fourth pulls, respectively, is higher than both the second and fourth pulls. Similarly, the player receives nothing for the sixth pull, because the seventh pull is higher.
10. The player begins a contract period with a number of credits that is less than the equivalent amount of money he has paid. For example, a player inserts $50 into a gaming device and then receives 30 credits.
11. The player is only allowed a certain number of winning outcomes within a given time frame. For example, the player may only win three times in any 30-second period. If the player wins more than 3 times in a 30-second period, then the third win may be a push. With such a tax in place, a player may be required to maintain a certain rate of play so that he does not pause for the remainder of a 30-second period after having won three times. Time frames may be overlapping or non-overlapping. In the latter case, for example, the player cannot win more than 3 times in any rolling 30-second period. In the former case, there are discrete 30-second periods during which the player cannot win more than three times. However, a player can win more than three times within 30 seconds by winning twice at the end of a first period, and twice at the beginning of a second.
12. The player is only allowed the highest outcome during any given time period.

For example, the player might get only the highest outcome from any 30-second period. Once again, the periods might be overlapping or non-overlapping. In variations, a player is allowed the highest paying n outcomes within any given time frame. Alternatively, the player might be allowed the $2^{nd}$ highest paying outcome in any given time frame, the median paying outcome, etc.

13. A player is restricted to win no more than twice his prior win. For example, a player might win 3 coins on a first outcome. Three handle pulls later, the player wins 10 coins. However, since the player's earlier win was 3 coins, he may now receive only 6 coins instead of 10, since six coins would be twice his earlier win. Now, on a subsequent handle pull, the player might win up to 12 coins (or in some embodiments, up to 20 coins, even though he was not given the full 10 coins). Suppose, however, that after his win of 3 coins, the player's next win was one coin. Then, on a later win, the player would be restricted to a maximum of two coins.
14. One or more coins is taken from a player upon the occurrence of a predefined event or sequence of events. For example, every time the player loses on three consecutive spins, a coin is taken away from him. Alternatively, if a player wins three times in a row, a coin might be taken from him. In another example, if a player wins more than 5 coins on three consecutive spins, a coin is taken from him. In another example, if a player wins more than 20 coins in any two-minute period, then a coin is taken from him.
15. A percentage of a player's credit balance is taken upon the occurrence of some random event, such as an outcome. For example, an outcome consisting of three blanks on the three reels of a slot machine might cause a player to lose half of his balance. Any fractional amounts of a player's balance may be rounded up or down.
16. A fixed amount of a player's credit balance is taken upon the occurrence of some random event, such as an outcome. The number of credits taken may be 5, 10, etc. In particular, the number of credits taken may be more than the maximum possible wager at the gaming device, or more than the player's last wager.
17. When a player's credit balance meets certain criteria, the player is limited as to what outcomes constitute winning outcomes, or as to how much he can win. For example, when a player's credit balance exceeds 200, he may only be restricted to receiving 50% of any payouts. In another embodiment, when the player's credit balance goes below zero, the player may be able to win only the jackpot. In one embodiment, when the player's credit balance first meets one of the designated criteria (e.g. when it goes over 200), the taxes may apply thereafter, even if the player's credit balance later ceases to meet the criteria. For example, if a player's credit balance goes over 200, then all future outcomes, at least for that contract period, may give the player only 50% of what the outcomes would normally pay. In other embodiments, the tax ceases to apply once the player no longer meets the criteria.

Any of the above taxes may have exceptions to when the tax is applied. In particular, exceptions may occur when the player receives a jackpot outcome. For example, even if a tax prevents a player's balance from exceeding $150, the player's balance may go above $150 if he obtains a jackpot-winning outcome. If an outcome would ordinarily be a push (e.g. because the prior outcome was a win and a player is prevented from winning twice in a row), and a jackpot-winning outcome occurs, then the player would still be allowed to win the jackpot.

Any of the above taxes may also be limited such that not more than a predetermined amount of money is taken from the player during a contract period or during any particular time period. For example, suppose a player is taxed such that whenever he attains a streak of winning outcomes, he receives only the payout for the first outcome, and the rest of the outcomes in the streak are treated as pushes. So if a player were to lose on a first pull, and then achieve consecutive outcomes paying 12, 8, and 2, then the player would actually receive 14 coins: 12 coins for the first outcome, 1 for the second (to repay the cost of the wager), and 1 for the third. In effect, the player has given up seven coins for the second outcome, and 1 coin for the third outcome, for a total of eight coins given up due to the tax. If, at the end of 20 minutes, the player has given up more than 30 coins due to the tax, then the excess coins may be returned to the player. Alternatively, if the player has paid 30 coins due to the tax, prior to the expiration of the 20-minute period, then the tax may no longer apply until the 20-minute period has expired.

In some contracts, a player is responsible for placing wagers from his own money even after having paid to enter into the contract. These contracts may constitute insurance contracts, whereby the player pays a fixed amount upfront, and then proceeds to wager as usual. After a given time period, or a given number of handle pulls, the player may receive some money back from the gaming device. The money he receives may be an insurance payout for any losses the player has suffered in excess of a certain threshold. For example, the player initially pays $20. He then makes 250 handle pulls, inserting wagers for each, and collecting winnings from each. The gaming device determines whether, in the 250 pulls, the player has lost more than $40. If he has, the gaming device pays the player enough so as to bring the player's total losses down to only $40. Another variation of an insurance contract pays the player a fixed percentage of losses below a certain threshold. For example, at the end of an insurance period, the player may receive back 50% of any losses sustained in excess of $50. Therefore, a player who had lost $100 would receive $25 back.

In some embodiments, the player may purchase insurance for a variable time period. The insurance then pays the player such that the player's losses are limited to a fixed amount per unit of time. For example, the player might purchase insurance that limits his losses to $30 per hour. If the player then plays for 2 hours, the gaming device will reimburse him enough money to limit his losses to $60. If the player plays for 3 hours, the gaming device will reimburse him enough money to limit his losses to $90.

In some embodiments, a player enters into a contract, such as an insurance contract, that requires the player to pay money on a periodic basis, not just upfront. For example, the player must pay an extra coin every three spins in order to remain insured. After the player has made a predetermined number of regular payments, the cost of the insurance may even go down. For example, instead of paying one coin every three pulls, the player may pay two coins every seven pulls. In this way, a player becomes 'invested' in his play. If an insured player leaves a gaming device where he has good insurance rates, he risks having to start over at a new gaming device with higher rates.

The player may pay for contract play, including insured play, in any number of other ways, described in the section on taxes above. For example, the player may agree to have one coin taken away from any payout of 4 coins or more, or may agree that any second consecutive win will count as a push.

Related to an insurance contract is a contract that rewards a player for a fixed amount of play, regardless of whether the player has sustained losses. For example, whereas an insurance contract might pay a player only if he has sustained losses after 20 minutes of play, a contract of the present embodiment rewards a player simply for completing 20 minutes of play. In this embodiment, the player plays in a normal fashion, using his own money to make wagers, and directly receiving any winnings. However, after a fixed period of time, or after a fixed number of handle pulls, the player may receive a benefit, such as a cash payment, a coupon, voucher, or gift certificate, or a number of free spins.

Free spins may give the player the opportunity to win standard payouts on the gaming device. Alternatively free spins may be for alternate prizes. For example, a free spin may allow a player to spin for products or services associated with the casino or with some third-party merchant. A special reel or wheel of the gaming device may contain a free meal pass, a free pair of show tickets, a gift certificate at an online bookstore, etc. The reel may use different symbols than those associated with the normal play of the game. Alternatively, a spin for prizes may employ a standard reel, or reels of the slot machine, with different symbols or symbol combinations given alternate meanings. For example, the cherry symbol wins the player a free line pass. The bar symbol wins the player a free pair of show tickets, the diamond symbol wins the player a $100 gift certificate at the casino's jewelry store.

Also related to insurance play is a contract where the player pays upfront for a fixed period of play, or a fixed number of handle pulls at which the gaming device assumes a more favorable configuration. For example, payouts associated with one or more outcomes may increase. Winning outcomes may occur with greater frequency. The size of the jackpot may increase. In one embodiment, the player might pay $10 upfront. Then, for the next half hour, the gaming device may reconfigure itself to pay true odds, or to return an average of 100% of the amount wagered. Once again, rather than paying upfront, the player may pay on a periodic basis for an improved machine configuration.

Typically, a gaming device can sell only one pull to a player. After making a pull, the player can simply leave, and the gaming device is thereby deprived of further business from the player. The gaming device has a better chance of making repeat sales to a player when he inserts, say, a $20 bill. A player who has just inserted a large bill typically receives a large number of credits on the gaming device. It is then very easy for the player to make a large number of handle pulls, since each handle pull can be purchased electronically using a credit on the meter. Nevertheless, a player with a large credit balance typically still has the opportunity to cash out at any time and to leave the gaming device.

In one embodiment, a contract allows the gaming device to sell a large block of handle pulls to a player at once. In return for purchasing in bulk, the casino can give the player a reward. Once the player has paid for a block of spins, the player may be bound to make those spins. In other words, he may not be able to cash out a credit balance corresponding to any spins he has not made. (He may, on the other hand, be able to cash out any winnings that result from making those spins). However, since the player has paid in advance, and committed to a certain number of handle pulls, the gaming device may reward the player with cash, with extra spins, with comps, or with any other benefit. For example, for $50, a player might receive 52 spins at a $1 machine. Alternatively, the player may receive 50 spins and a free meal comp.

One important aspect of allowing the advanced purchase of handle pulls is the way the handle pulls are displayed to the player. If a player pays $50 and receives 52 handle pulls, then there would be a drawback to simply putting 52 credits on the credit meter. Certainly, the 52 credits would pay for the 52 handle pulls. But the player might think that he has the option to cash out the balance of his credit meter at any time, and may then be disappointed when he is unable to do so. Therefore, in one embodiment, a balance separate from his credit balance is displayed to the player. This new balance is a spin balance. The spin balance shows the number of spins the player is allowed. Players can be taught that a spin balance is only good for spins, and that it cannot be cashed out, whereas a credit balance can be cashed out at any time. Additionally, any winnings paid using spins from the spin balance may be added to the player's credit meter. The player would then be able to receive the winnings immediately, if he so desired.

A spin balance is also applicable outside the framework of contracts. A player, in the course of regular play, might win several free spins. The player might have the option of using the spins at any time. Such spins can be added to the player's spin balance, so that it is clear they are not credits and cannot be cashed out. FIG. 10 shows a gaming device that has both a credit balance and a spin balance displayed. A player at such a gaming device might cash out the 12 credits in the credit balance at any time. The player might also use up spins by pressing the "Use Spin" button. When the player presses the "Use Spin" button, a spin is deducted from the player's spin balance, but not from his credit balance. In some embodiments, not illustrated, a player may be able to use multiple spins at once. Using multiple spins at once might be equivalent to betting multiple coins at once, and may make the player eligible for a higher pay table, or for the bonus round. In some embodiments, a player might be able to use both spins and credits on a single handle pull. For example, the player uses 2 credits and 1 spin, which would get the player an equivalent pay table as if he had used 3 credits.

In some embodiments, even after a player has prepaid for a large number of handle pulls, and has received a benefit, the player may still cash out an amount of money corresponding to unused handle pulls. For example, if the player has paid $50 for 50 handle pulls plus two bonus handle pulls, and has made 30 handle pulls, the player may cash out and receive $20 back. However, the player may thereby forfeit any benefit he received, i.e. the two bonus handle pulls.

As described herein, players may have some restrictions on the play covered by the contract. For example, a contract may cover an hour's play at a gaming device, but require the player to make between 600 and 800 pulls in that hour. In some embodiments, however, contracts may allow players to quit early or to play more than is otherwise covered by the contract. For example, a contract might cover an hour's worth of play. After the first half-hour, the player may be ahead by $100 and wish to quit without risking the loss of the $100 in the subsequent half-hour. He may therefore opt to pay $20 in order to be released from the obligation of continuing the contract. He may then collect his $100 in winnings.

A player at a gaming device may reach the end of a contract with accumulated credits just short of an amount necessary to collect winnings. However, the last 17 out of 20 pulls may have been wins for the player. The player may feel as if he has some momentum going for him and therefore may not wish that the contract be finished. In some embodiments, the player may extend the contract. For example, the gaming device might prompt the player, saying, "For only $5 more, we'll give you another 200 spins added to your contract." If the player accepts, then the casino or insurer has made a new sale with potential profitability. In some embodiments, the player may be allowed to extend a contract for free, or may even be paid to extend the contract. For example, the player may have winnings of $100 at the end of a contract. The casino, or insurer, may figure that if the player were to keep pulling, he would be likely to lose some of that $100. So the casino may pay the player $5 to take another 200 pulls.

In a related embodiment, a player may carry over the accumulated credits from a first contract to a second contract. Thus, a player with 40 accumulated credits at the end of a first contract may begin a second contract with 40 accumulated credits. The player may pay or be paid for carrying over credits.

In many embodiments, the player pays a fixed sum to buy the contract. In exchange for that fixed sum, the player can then gamble a significant amount with little or no risk of losses. In many embodiments, the insurer takes the risk of the player's loss. The insurer must therefore price the contract so as to be compensated for the risk it takes. In other embodiments, the casino and the insurer share the profits and losses associated with a contract. To ensure a profit to be divided amongst the two, a contract may be priced in excess of a player's average win. Note that a player's loss would count as zero in figuring out the player's average win, since the player does not have to pay for losses.

One method of establishing the price of the contract involves first figuring out what the insurer might expect to pay, on average, to cover a player's losses. Another method of pricing a contract involves first figuring out what the casino/insurer combination might expect to pay, on average, to compensate a player for his winnings. Both methods involve similar computations. Therefore, computations will be described below with respect to only one or the other method of pricing a contract.

1) The insurer obtains the gaming device or a component of the gaming device containing significant information about the operation of the gaming device (e.g. the CPU). The insurer then operates the gaming device as a player would when under contract. For example, if the insurer is to sell contracts for 600 pulls, the insurer would make 600 handle pulls at the gaming device and record the number of accumulated credits at the end of the 600 pulls. The insurer may repeat this process of testing contracts at the device for a large number of trials. The insurer may then average what its payments would be over all the trials. Note that while it might take a player days or years to complete, say, 100,000 contracts at a gaming device; the process may be sped up for the insurer by giving the gaming device special instructions to generate outcomes more rapidly. The performance of large number of trials in the manner described above is often called a Monte-Carlo simulation.

The following is an example of pricing a contract. Using the method of pricing described above, an insurer simulates the execution of a 600-pull contract. The insurer repeats the simulation four more times. After the first simulation, the player has won $10. After the second, the player has lost $5. After the third, the player has lost $17. After the fourth, the player has lost $8. After the fifth, the player has won $3. To figure out what the insurer must pay, on average, the insurer adds the three losses to get: $5+$17+$8=$30. The insurer then divides by five, the number of simulations, to get: $30/5=$6. The insurer doesn't care, for the purposes of this calculation, how much the player won when he did win, since the casino is the one paying the player his winnings. Now, in order to obtain an average $4 profit, the insurer might charge $10 for each contract.

2) The insurer obtains or creates software that mirrors or models the operation of the gaming device. For example, the software is configured to generate the same outcomes as does the gaming device with the same frequency as the gaming device. For each outcome generated, the software tracks what a player's accumulated credits would be. As before, the insurer may simulate many contracts and average what its payments would be over all the trials.

3) The insurer mathematically models potential outcomes of one handle pull of the gaming device using a random variable with a probability mass function (PMF) or probability density function (PDF). With these functions, the x-axis may represent potential winnings, such as −$1 or $3, which can occur from a single handle pull. The example of −$1 indicates the player has paid $1 for the pull but has won nothing. The example of $3 indicates that the player has paid $1 for the pull and won $4. The y-axis of these functions represents the probability or probability density of each outcome occurring. The probability of the player getting −$1 on a pull might be 0.8, while the probability of the player getting $3 might be 0.2. A PMF for the number of accumulated credits at the end of a contract can then be created by summing the random variables representing individual handle pulls. If each pull is independent with an identical PMF, as is common with slot machines, then the PMF for the results of the entire contract can be created using repeated convolutions of the PMF's for individual handle pulls. If, for example, 600 pulls are involved, then the PMF for single a handle pull may be convolved with itself 599 times to generate a PMF for the entire contract. Using this resultant PMF, the insurer can easily calculate how much it would expect to pay to cover a player's losses on each contract. If the resultant random variable is denoted by w, and the insurer would by required to pay for any player losses, then the insurer's expected payment is given by $$\Sigma_{-\infty}^{0} w * \text{probability}(w).$$

4) In the method described above, Fourier Transforms, Z transforms, Laplace Transforms, or other transforms can be used to aid in the calculation of the repeated convolutions. Such a use of transforms is well known in the art.

5) As is well known in the art, with many classes of random variables, repeated summation results in a Gaussian probability distribution. This distribution has the shape of the familiar bell curve. The Gaussian distribution has the advantage of being fully described by only two parameters, a mean and a standard deviation. If a Gaussian probability distribution is used to approximate the sum of a large number of independent, identically distributed random variables, such as those that often describe handle pulls, then the mean and standard deviation of the Gaussian distribution is very easily calculated based on the mean and standard deviation of a random variable describing an individual pull. Such calculations are well known in the art. Thus, a Gaussian distribution can easily be generated to approximate the PMF of a player's accumulated credits at the end of a contract. Using this distribution, the insurer can calculate the amount it would be required to pay, on average, to cover a player's losses. The method of calculation is similar to that described in 3). If a Gaussian PDF is used as an approximation, then an integral sign replaces the summation sign, and "probability" is replaced by "probability density."

The following is an example of using a Gaussian probability density function to approximate the amount a casino would be required to pay, on average to, to compensate a player for his winnings at the end of a contract. The contract may then be priced in excess of this amount to ensure an average profit for the casino/insurer combination. A Gaussian function is given by the formula, $f(x)=1/\sqrt{}(2\pi\sigma)\exp(-(x-\mu)^2/(2\sigma^2))$. In this formula, $\sigma$ is the standard deviation, and $\mu$ is the mean. Now, let us suppose that a single handle pull of a slot machine results in a required payout to the player described by a probability mass function with mean $\mu_0$ and standard deviation $\sigma_0$. Then, assuming each handle pull is independent, n handle pulls of the slot machine may be described by a function with mean $\mu=\mu_0 n$ and standard deviation $\sigma=\sigma_0\sqrt{n}$. Furthermore, if n is large, then the function describing a casino's aggregate payout after n handle pulls may be approximated by the Gaussian function f(x), whose formula is given above.

To calculate what a casino would have to pay to compensate a player for his winnings, on average, we note that the casino pays when the player wins, but receives nothing when a player loses. Therefore, the expected payment of the casino is given by:

$$\int_{-\infty}^{0} 0*f(x)dx + \int_{0}^{\infty} x*f(x)dx = \int_{0}^{\infty} x*f(x)dx.$$

We proceed to solve the integral:

$$\begin{aligned}
\int_{0}^{\infty} x*f(x)dx &= \int_{0}^{\infty} x*1/\sqrt{}(2\pi\sigma)\exp\left(\frac{-(x-\mu)^2}{(2\sigma^2)}\right)dx \\
&= 1/\sqrt{}(2\pi\sigma)\int_{0}^{\infty} x*\exp\left(\frac{-(x-\mu)^2}{(2\sigma^2)}\right)dx \\
&= 1/\sqrt{}(2\pi\sigma)\int_{0}^{\infty}\left[\begin{array}{c}(x-\mu)*\exp\left(\frac{-(x-\mu)^2}{(2\sigma^2)}\right)+ \\ \mu*\exp\left(\frac{-(x-\mu)^2}{(2\sigma^2)}\right)\end{array}\right]dx \\
&= 2\sigma^2/\sqrt{}(2\pi\sigma)*(-1/2)*\left[\exp\left(\frac{-(x-\mu)^2}{(2\sigma^2)}\right)\right]_0^{\infty} + \\
&\quad \mu\int_{0}^{\infty} 1/\sqrt{}(2\pi\sigma)\exp\left(\frac{-(x-\mu)^2}{(2\sigma^2)}\right)dx
\end{aligned}$$

We deal with the two terms separately:

$$\begin{aligned}
\frac{2\sigma^2}{\sqrt{}(2\pi\sigma)}*\left(\frac{-1}{2}\right)*\left[\exp\left(\frac{-(x-\mu)^2}{(2\sigma^2)}\right)\right]_0^{\infty} &= \frac{-\sigma^2}{\sqrt{}(2\pi\sigma)}*\left[0-\exp\left(\frac{-\mu^2}{(2\sigma^2)}\right)\right] \\
&= \sigma^2\exp\frac{\left(\frac{-\mu^2}{(2\sigma^2)}\right)}{\sqrt{}(2\pi\sigma)} \\
&= n\sigma_0^2\exp\frac{\left(\frac{-n^2\mu_0^2}{(2n\sigma_0^2)}\right)}{\sqrt{}(2\pi\sqrt{}n\sigma_0)} \\
&= n^{3/4}\sigma_0^{3/2}\exp\frac{\left(\frac{-n\mu_0^2}{(2\sigma_0^2)}\right)}{\sqrt{}(2\pi)}
\end{aligned}$$

and

-continued $$\mu\int_0^\infty \frac{1}{\sqrt{(2\pi\sigma)}}\exp\left(\frac{-(x-\mu)^2}{(2\sigma^2)}\right)dx = \mu\int_{-\mu/\sigma}^\infty \frac{1}{\sqrt{(2\pi\sigma)}}\exp\left(\frac{-y^2}{2}\right)\sigma dy$$

$$\left(\text{where } y=\frac{(x-\mu)}{\sigma}\right)$$

$$= \mu\sqrt{\sigma}\int_{-\mu/\sigma}^\infty \frac{1}{\sqrt{(2\pi)}}\exp\left(\frac{-y^2}{2}\right)dy$$

$$= \mu\sqrt{\sigma\left[1-\int_{-\infty}^{-\mu/\sigma}\frac{1}{\sqrt{(2\pi)}}\exp\left(\frac{-y^2}{2}\right)dy\right]}$$

The integral is the cumulative distribution function for a zero mean, unit standard deviation Gaussian, for which tables exist. We denote it by $N(-\mu/\sigma)$. Continuing:

$$\mu\int_0^\infty \frac{1}{\sqrt{(2\pi\sigma)}}\exp\left(\frac{-(x-\mu)^2}{(2\sigma^2)}\right)dx = \mu\sqrt{\sigma}\left[1-N\left(\frac{-\mu}{\sigma}\right)\right]$$

$$= n\mu_0 n^{1/4}\sqrt{\sigma_0}\left[1-N\left(\frac{-n\mu_0}{(\sqrt{n\sigma_0})}\right)\right]$$

$$= n^{5/4}\mu_0\sqrt{\sigma_0}\left[1-N\left(\frac{-\sqrt{n}\mu_0}{\sigma_0}\right)\right]$$

Recombining the two terms we get:

$$\int_0^\infty x*f(x)dx = n^{3/4}\sigma_0^{3/2}\exp(-n\mu_0^2/(2\sigma_0^2))/\sqrt{(2\pi)} + n^{5/4}\mu_0\sqrt{\sigma_0}[1-N(-\sqrt{n}\mu_0/\sigma_0)]$$

If we were to graph the above as a function of n, the number of pulls, we would see that initially, as the number of pulls in a contract gets larger, a casino could expect to pay more money to compensate a player for his winnings. However, there would reach a point, beyond which more pulls in a contract would actually decrease the amount a casino could expect to pay to compensate a player for his winnings. This illustrates an important feature of contracts. Having more pulls in a contract is not necessarily an advantage for a player.

6) A casino or insurer may start with a first price for a contract, and then evolve the price as more and more of the contracts are purchased and executed. For example, if an insurer loses money on the first few contracts it sells, then it may increase the price of the contract. If the insurer makes large profits on its first few contracts, then it may reduce the price.

Once the insurer has determined what it can expect to pay, on average, to cover a player's losses, the insurer may price the contract so as to give itself a desired profit margin. For example, if the insurer can expect to pay, on average, $15 to cover a player's losses, then the insurer might price the contract at $20 to insure itself a $5 average profit.

A contract will often require certain behaviors of the player. As described, these behaviors may include maintaining a certain rate of play, or performing a minimum number of handle pulls. The gaming device on which a contract is executed may take various steps to ensure that the behaviors are performed. To this end, the gaming device may initiate handle pulls automatically or may fail to register handle pulls that the player attempts to initiate. For example, if the player must make at least one handle pull every 10 seconds, and the player has failed to make any handle pulls in 9 seconds, then the gaming device may automatically initiate a handle pull for the player on the tenth second. As another example, a player may be restricted from making more than one pull every 10 seconds. If in the same 10-second interval, the player attempts to make more than one handle pull, the second handle pull may not be initiated, at least until the next 10-second interval.

As can be seen from the above two examples, the player may maintain some control over his gambling behavior even while the gaming device forces him to comply with the contract. So a player who must make a pull every 10 seconds still has control over whether the pull occurs on the first second of an interval or the eighth second of an interval. Such control can be psychologically important, because many players feel that the exact moment at which they initiate a handle pull has an important effect on the ultimate outcome.

In many cases, a player may not desire to make any active decisions once a contract has been initiated and may simply put a gaming device into "automatic play." The player may later have the option of taking the gaming device out of automatic play and of manually initiating handle pulls. One further advantage of automatic play is that the gaming device in automatic play mode may generate outcomes very rapidly. Since most modern gaming devices generate outcomes using a computer processor, and since computer processors may execute billions or more instructions per second, a gaming device could easily generate any number of outcomes a player might desire in as short of a time period as desired. For example, a player may have a lunch date in 10 minutes, but may wish to make 1000 handle pulls before then. The player may thereby enter into a contract with the gaming device in which the player will pay, say, $30, the gaming device will rapidly generate 1000 outcomes (at $1 per outcome), and the player will receive any positive amount of remaining credits. In fact, such a contract would likely be profitable for the gaming device, since a gaming device starting at $30, with a house advantage, is unlikely to have a positive credit balance after 1000 pulls.

Another aspect of automatic play would allow the events of a television show, movie, sports broadcast, etc., to automatically initiate handle pulls on behalf of the player. For example, a player might insert 100 credits into the gaming device, and agree to allow the gaming device to automatically deduct a credit, and initiate a handle pull anytime the word "love" is said in a 30-minute soap opera. Meanwhile, the player may enjoy the show.

A contract may be offered to a player in a number of ways. A gaming device may use text or synthesized voice to ask a person whether or not he would like to sign up for a contract. A casino attendant may offer a contract to a player, or signs at a casino may point a player towards a casino desk where he may then purchase a contract.

A number of circumstances may trigger the casino or an insurer to offer a contract to the player. For example, the player may have lost most of an initial stake deposited into a gaming device. A player may be slowing his play, or may no longer be inserting coins into the machine. The time of day may be a player's typical lunch time or departure time. A player may have the opportunity to enter into a contract only if he also agrees to do business with a particular merchant or group of merchants. A player may have the opportunity to enter into a contract if the casino or insurer deems him a good, valuable, or loyal customer.

A player may specify a desired contract in a number of ways. At a gaming device, a player may use a touch screen to indicate his desire to enter into a specific contract. Using the touch screen, the player may select from a menu of possible contracts. For example, the menu might list several contracts with different time durations or different prices. The player could then select a contract by touching an area of the screen next to his desired contract.

The player might use menus to customize a contract for himself. The player might use a first menu to select a duration of the contract (e.g. 600 pulls, or ½ hour). A second menu might be used to select a rate of play. A third menu might be used for coin denomination. Many other menus are possible for other contract features. Once the player has selected several contract features, the gaming device may select the remaining feature so as to make the contract profitable for the insurer. For example, once the player has chosen a number of pulls and a coin denomination, the gaming device might choose the price of the contract.

Rather than a touch screen, a player may use special buttons, keys, or voice input to specify a desired contract or contract terms.

In some embodiments, a player chooses a contract prior to approaching the gaming device or even the casino. A player might select a contract on the Internet. On the Internet, the player might specify terms of the contract, such as the number of pulls, the rate of play, the cost, the payout tables, the winning symbol combinations, etc. The player may then print out a code or a document describing the terms of the contract. The player then brings the code or document to a gaming device that then recognizes what contract the player has chosen. When the player signs up for a contract, a description of the contract might be sent electronically directly to the gaming device. The player might then only identify himself at the gaming device in order to initiate contract play.

Other terms of a contract a player may agree to or specify include: the font size of the machine, the noise level of the machine's sound effects, the particular game (e.g. number of reels, number of pay lines), the brightness of the display, etc.

To confirm entry into a contract, a player might sign a document that may contain the terms of the contract. The document may be printed from a gaming device or from the Internet, or may be obtained from a counter at a casino. The signed document may then be deposited into an opening in the gaming device, may be returned to a casino counter, or may be kept by the player. The player might also sign an area on a touch screen or other sensing device.

A player might also confirm entry into a contract simply by paying for it. The player might pay be depositing tokens, coins or other currency into the gaming device. The player might pay using a credit or debit card. The player might also pay from a player credit account established with the casino. The player might pay at a counter of the casino and might receive a contract or a contract indicator to bring to a gaming device. The gaming device might then recognize the contract indicator by, for example, a bar code, and then execute the contract.

A typical contract may cover and/or require a large number of handle pulls by the player. Now ordinarily, when a player is gambling at a gaming device for a long period of time, the player makes a number of decisions related to his gambling. Should the player play more quickly or more slowly? Should the player double his bet after a loss? Should the player quit after a sizable win? Should the player take a short break to use the restroom?

Since the contract covers a large number of pulls, it is possible for some player decisions to be made before hand and included in the contract. A gaming device may then act on the decisions specified in the contract without further input from the player. For example, while negotiating a contract for an hour of play at 10 pulls per minute, a player might decide he'd like a 15 minute break between the first ½ hour and the second ½ hour of pulls. The gaming device might then execute the contract for the first half hour by automatically spinning and generating outcomes for the first ½ hour. The gaming device might then freeze for 15 minutes, preventing other players from stepping in and allowing the contract holding player to take his 15 minute break. The device can then unlock after 15 minutes, perhaps with the entry of a password, and resume the generation of outcomes.

One important aspect of having a player's decisions spelled out before hand in the contract is that the player need not even be present at the gaming device. A player can sign up for a contract at a casino in Las Vegas, and then have the contract executed automatically by a gaming device. The player can then view a running tally of his accumulated credits over the Internet while in Virginia, for example.

In general, player instructions built into a contract will include some action to be performed as well as some triggering condition for the action. As an example, a player instruction may be to increase the rate of handle pulls provided accumulated player credits exceed 100. In this example, the action is to increase the rate of handle pulls, and the triggering condition is whether accumulated player credits exceed 100.

The following player actions may be part of a player's instructions:

1. Increase or decrease a wager amount on one or more handle pulls
2. Increase or decrease a rate of wagering
3. Cease gambling
4. Change the way outcomes are displayed The following conditions may trigger the above actions:

1. The player has just won or lost on one or more handle pulls
2. The player has just won a certain amount on one or more handle pulls
3. Any player defined sequence of wins and losses has occurred on prior handle pulls
4. The player has approached or left the vicinity of the gaming device
5. It has reached a particular time of day Player instructions may tell the slot machine to play faster when the player is present or is observing in some way, and to play more slowly while the player is asleep. For example, the rate of pulls may be twice as fast during the day as at night. The rate of play may likewise be faster when an infrared detector in the slot machine senses the heat of the player's presence.

Player instructions may also tell a gaming device how to play certain games involving player decisions. For example, a player may leave instructions to use basic strategy in a game of video blackjack, or to play according to published theory in a game of video poker. The player may add instructions to always hit a draw to a straight flush.

A contract may be executed over a range of different time periods. The outcomes, the accumulated player credits, and the player winnings may or may not be displayed to the player at the same time at which the outcomes are being generated.

In one embodiment, all the outcomes needed for a contract are generated very rapidly by a gaming device, perhaps all in less than a second. The outcomes may then be displayed to the player over a much longer time frame so as to give the player a more exciting gaming experience.

In another embodiment, outcomes may be continuously generated at a rate comparable to that with which a player might make handle pulls on his own. This embodiment might be entertaining for a player if the player is sitting at the gaming device or watching the outcomes being generated from a home computer.

In another embodiment, outcomes are generated on a periodic basis at fixed times every day, week, hour, etc. For example, outcomes for a 600-pull contract may be generated 100 outcomes at a time, each block being generated from 8 pm-9 pm on Sunday. Thus, it would take just under six weeks for the entire contract to be executed. This method of execution may be ideal if a player has a schedule as to when he enjoys watching outcomes being generated. For example, the player might enjoy seeing outcomes generated while he watches his favorite show on Sundays from 8 pm to 9 pm. This method of execution might also be ideal for the casino if slow business periods occur on a periodic basis where the entire contract cannot be executed in a single period.

In still another embodiment, outcomes are generated on a flexible basis, either when it is convenient for the casino or for the player. In this embodiment, the casino may wait for a gaming device to be free of use before using it to generate the next couple of outcomes of a contract. Alternatively, the player may signal the gaming device any time he is ready to have the next few outcomes generated In many contract embodiments, there is a limiting element of time or handle pulls. As such, it is useful for the gaming to display to the player a measure of the amount of time remaining in a contract, or a measure of the number of pulls remaining. As an example, a contract may allow a player to insert $20 into a gaming device, play for three minutes without paying for any handle pulls, and to keep any money won during the three minutes of play. During the time period covered by the contract, the gaming device may display a clock to the player that counts down the time starting at three minutes. So the clock would begin at “3:00”, then read “2:59”, etc. Of course, the clock could also begin at zero and count up to 3:00. The clock could display time to any desired precision, including hours, minutes, seconds, tenths of a second, hundredths of a second, etc. For longer contracts, the clock could display days, weeks, months, years, etc. The clock could be analog or digital. The clock could be built into the gaming device as a dedicated LCD display or even as an actual clock with gears or pendulums. Alternatively, the clock could be displayed on the display screen of the gaming device.

With a clock ticking off the seconds, a player would always be aware of how much time he had to finish a contract. In contracts where making a large number of handle pulls benefits the player, the player might find it very exciting trying to complete as many handle pulls as possible before time runs out. The clock would also reduce the potential for disputes by players who believed they were not given enough time to complete the play of a contract.

In many embodiments, once the clock has reached zero, the player’s time for completing the contract has finished, and no more of the player’s handle pulls count towards the contract. The player may be given one additional handle pull even after the clock has hit zero, so as to eliminate any dispute from the player as to whether he actually made the last handle pull in time to be counted.

Just as a clock may track the elapsed time for a contract, a counter may track the number of handle pulls made in a contract, or the number of handle pulls yet to be made in the contract. For example, if a contract allows a player to make 500 handle pulls, then a counter may begin at zero and increment by one every time the player completes a handle pull. When the counter reaches 500, the player is finished. Alternatively, the counter may begin at 500 and count down to zero.

In some embodiments, during the course of a contract, a player may win extra time, or may win the opportunity to make additional handle pulls. For example, one symbol on the reels of a slot machine may be a clock symbol. If the player obtains the clock symbol, the player may be given an extra minute in which to complete the pulls of his contract. In another example, the player may obtain a symbol that gets him a certain number of extra spins for his contract. Note that extra spins do not necessarily constitute free spins, because the extra spins may only occur within the framework of a contract. Thus, if a player has a large negative credit balance in a contract where he keeps any positive credit balance, a few extra spins might do him little good, since the player is unlikely to get out of negative territory. In some embodiments, a player may win extra spins even though his contract is for a set period of time. In this case, after the expiration of the time period covered by his contract, the player may get to make the number of extra spins that he had won during the period. Additionally, a player whose contract specifies a number of spins allowed, may win extra time. In this case, once a player has completed his spins, he may be allowed the extra period of time in which to make as many spins as he can.

In some embodiments, the gaming device provides an alert to the player when the time remaining has reached certain levels. For example, a player’s contract might provide insurance to a player, with the insurance covering any losses sustained by the player during a ten-minute period. When the player has only one minute left in the contract period, the gaming device may provide an alert to the player such as, “One minute to go! Get in all the pulls you can!” Providing an alert to a player may add a sense of excitement, as the player may try to make handle pulls more rapidly, much as a runner might pick up his pace as he approaches the finish line of a race. Additionally, providing an alert to a player can reduce the likelihood that a player will be caught by surprise when a contract period ends. A player might be upset were he to assume that a contract was still in effect even after the period covered by the contract had elapsed. For example, the player might be upset if he believed his losses to be insured, when in fact they no longer were. Just as a gaming device may alert the player as to the amount of time remaining in a contract period, so too might the gaming device alert the player as to the number of pulls remaining.

The gaming device may also provide the player with periodic updates of his status in relation to the contract. Exemplary status information may include:

1. The player’s credit balance.
2. The number of additional credits the player needs to win in order to receive a payment. For example, at the end of a contract, the player may get to keep any number of credits exceeding a threshold of 100 credits. If the player currently has a credit balance of 90 credits, then the gaming device may print a message such as “Win only 10 more credits and you’re in the money!”
3. The number of credits the player is guaranteed so far. For example, a contract may guarantee a player a number of credits equal to half of the highest credit balance the player achieved during the contract. Thus, if the player has already achieved a balance of 100 credits at some point during the contract period, then the gaming device may tell the player “You are guaranteed 50 credits. Keep on playing!" In another example, a contract guarantees that a player will always receive a certain minimum payment at the end of the contract period. For example, the player begins with a balance of $50, but will always receive at least $40 at the end of a contract period. In this case, the gaming device may print a message for the player such as, "Five minutes to go. Minimum payment: $40."

4. The number of credits a player would receive if the contract were to end right then. For example, if a contract allowed a player to receive any credits in excess of 40, and his current credit balance was 60, then the gaming device might display a message such as, "You are 20 credits ahead."

Note that status information may be displayed separately or in conjunction with information concerning the number of pulls remaining, or the amount of time remaining in the contract period.

Once the contract period has ended, the gaming device may also print status information for the player, including such information as his ending balance, and the amount of credits that are due to the player. In one embodiment, the player is prevented from spinning once his contract period has ended, but before he has received payment. In this way, the player is less likely to confuse handle pulls he has made that are covered by the contract, with handle pulls that are not covered by the contract. For instance, once the time period of a contract has ended, the gaming device may display the message, "Time is up. You have lost a total of $20 in the last 100 handle pulls. Your insurance covers half of your losses. You are due $10. Please press the 'Get Money' button on your screen to receive your payment."

Once the player presses the "Get Money" button, his gaming device may pay him $10. Once the gaming device has paid the $10 to the player, the player may begin spinning again, but this time outside of the framework of the contract.

One obstacle with contracts involving timed play is that the gaming device may malfunction in some way. For example, the reels of a mechanical-reel slot machine might jam. Or a player might cash out coins to tip a waitress, only to find that the coin hopper of the machine is empty, and the hopper will have to be filled by an attendant. During the time of the hopper fill, the player cannot spin. Therefore, in one embodiment, a player is given extra time during a contract that is timed, and where the gaming device malfunctions. The player may have the opportunity to actually decline the extra time. In some contracts, making additional handle pulls is a disadvantage to the player, and so it would benefit the player to lose the time. In another embodiment, the player may move to another machine and complete his contract there. To move to another machine, the player might receive a code from his first gaming device. The code might indicate, for instance, the terms of the contract, the amount of time the player has remaining, the player's balance, etc. The player might then type the code into a new gaming device. The new gaming device would then interpret the code according to standardized rules, and configure itself so as to allow the player to resume contract play at the same point from which he left off.

Many contracts require that a player play for the full period of time specified in a contract. For example, a player might have to play for a full hour in order to receive any winnings associated with a contract. If the player stops play before the contract period has fully elapsed, the gaming device may assume that the player has abandoned the contract. For example, once the gaming device has detected a pause in play of a predetermined length, the gaming device may reconfigure itself for regular play. The reconfiguration may entail zeroing out any credit balance associated with a contract, eliminating or blanking out any timer or counter associated with the contract, and turning off any indicators that a contract is in progress. Thereafter, the player who has entered into the contract may not have the opportunity to resume play in the contract. Alternatively, upon sufficient proof that a player had previously entered into a contract, the player may resume the play of a contract. For example, a player may present his tracking card to a gaming device at the time when he enters into a contract. The gaming device may then associate the player tracking card with the contract. If the player later leaves the gaming device, the gaming device may store a record of the state of the contract, including the number of remaining pulls, credit balance, etc. The player might later insert his tracking card into the same gaming device, or into another gaming device linked to the first, e.g. via a network. The gaming device may associate the player tracking card number with the unfinished contract, and reconfigure itself to contract play mode, allowing the player to complete his previously unfinished contract. The player may use many other means of proving his identity so as to resume contract play, such means including a password, an answer to a question, biometric data, etc.

In other embodiments, a player may be allowed to pause the progress of a contract so that he may take a break. For example, in the midst of a contract, a player may press a "freeze" button on his gaming device. The player may withdraw his tracking card, and walk to the restroom. In the meantime, for a designated period of time, no other player may be allowed to touch the first player's gaming device. The player may later return, reinsert his tracking card, and thereby unfreeze the gaming device so as to continue contract play. The time when the player was away may not have been counted towards the period of contract play. For example, if a contract period is to last an hour, and the player takes a five-minute break during the contract, then the player may finish contract play one hour and five minutes after beginning. If a player has left a gaming device, having pressed "freeze", and does not return to the gaming device within a designated period of time, then the gaming device may assume that the player will not return, and may reconfigure itself for regular play.

A player may be limited to a predetermined number of breaks during contract play, or to breaks of up to a maximum time duration. In some embodiments, if a player does not play for a predetermined period of time, the gaming device may initiate handle pulls automatically on behalf of the player.

As described herein, a player may enjoy watching from a remote location as the outcomes of his contracts are generated. Since the player is not physically at the slot machine, the outcomes must be presented to the player via some graphical representation. In one embodiment, a camera simply films the gaming device generating the player's outcomes. The image from the camera is transmitted to the player device (FIG. 5) via the Internet, the cable system, satellite, etc. The player device might be, for example, a TV or a personal computer. In another embodiment, the generated outcomes are recorded either by the gaming device, by a camera watching the device, or by a casino employee. The generation of the outcomes is then graphically recreated for the player in a manner not necessarily consistent with the physical appearance of the gaming device that generated the outcomes. For example, a gaming device generates the outcome: cherry-orange-lemon. The gaming device then transmits, via the casino server and the Internet, a bit sequence indicating the outcomes cherry-orange-lemon. Perhaps the bits "0000" represent cherry, "0011" represent orange, and "1111" represent lemon. The bit sequence is transmitted to a player's home computer, where a software program displays a cartoon representation of a slot machine. The cartoon shows the reels spinning and stopping with the outcome: cherry-orange-lemon. The cartoon representation of the slot machine may not look anything like the slot machine that originally generated the outcomes. In some embodiments, a player views a combination of the actual image of his gaming device, and a computer-rendered version of a gaming device. For example, a cartoon of the reels spinning might be displayed within the frame of an actual image of the slot machine, minus the reels.

In some embodiments, the player does not view a graphical representation of the outcomes, but sees the outcomes as text, such as "seven-bar-bar," "s-b-b," "7-b-b," etc. The player may not even see the outcomes, just how much he has won or lost on every pull. Thus, the player may view a periodically updated tally of his accumulated credits. He may only view his total accumulated credits, or his take home winnings, after all outcomes have been generated.

Any graphical or textual representation of the player's outcomes, accumulated credits, or other contract information may be displayed either on an entire portion of a computer or TV screen, or on a smaller portion of the screen. For example, a small cartoon slot machine may reside in a box in the upper right hand corner of a TV screen that simultaneously displays a regular TV show. A player watching television need then only glance up at the corner of his screen to follow the progress of his contract. Representation of outcomes may also be place in an email message to the player.

Of course, the various representations of outcomes may be used just as well with a player physically present at the gaming device or at the casino.

In some embodiments, the player calls up a number to monitor the progress of his contract. He may enter a code or password when prompted by a voice response unit (VRU) and thereby access the outcomes from his particular contract.

A player may be sent updates on his contract only when certain triggering conditions are met. For example, a player may only wish for updates when he wins more than 100 credits on a spin, or when the contract terminates.

In one embodiment, a gaming device on which contract play is in progress provides an explicit display that contract play is in progress. The display may serve to remind a player that certain activities that would otherwise be allowed are not now allowed. For example, in contract play, the player may not be able to cash out his credit balance. The player may not be allowed to wait more than 10 seconds between spins. Many different restrictions on a player may apply, depending on the nature of the contract. On the other hand, during contract play, certain rules or activities may apply that otherwise would not. For example, during contract play, a player might obtain outcomes that would cause him to lose numerous credits from his credit balance at once.

Furthermore, an obvious notice that contract play is in progress allows a player to act in his own benefit. For example, if the player has purchased an insurance contract for 200 pulls, then the player may beneficially make handle pulls during the insurance period, as he would not be responsible for all of his losses. On the other hand, were the insurance contract not in place, or were it to have expired, the player might instead wish to walk away from the gaming device.

FIG. 9 illustrates a gaming device on which contract play is in progress. A large text display on top of the gaming device is lit up, saying, "Contract Play in Progress."

As described herein, the pricing of a contract will often take into account the expected amount an insurer must pay to a casino to cover a player's losses, or the expected amount that a casino and insurer in combination can expect to pay to compensate the player for his winnings. Pricing of contracts may account for additional factors including:

1. Times or dates on which the contract will be executed
2. The gaming device on which the contract will be executed
3. Flexibility in the contract's execution
4. A player's gambling history
5. The importance of the player as a customer of the casino For example, a contract which is to be executed during a period of low customer activity at a casino may be priced at a discount. This is because a casino would like to encourage the use of gaming devices that are otherwise empty. Alternatively, a casino may want to discourage the purchase of contracts during times of high customer traffic, and so contracts may be higher priced at such times.

If a contract has flexibility as to when it may be executed, then this allows the casino to execute contracts only during times when gaming devices would not otherwise be in use. Therefore, such a contract might be priced more favorably.

A contract that is executed at an unpopular gaming device, for example, might be priced more favorably for the player so as to encourage the use of that device.

If a player shows signs of nearing the end of his gambling session, a contract might be priced at a discount for that player. For example, a player might be slowing his rate of play, indicating boredom. A player might be lowering his wager size, indicating a decreasing bankroll. A player might simply have been at a gaming device for such a long time that he would almost necessarily be hungry enough to leave at any moment. Providing a discount on a contract to such players would encourage them to remain gambling for at least the time it takes to execute the contract.

As discussed, a contract may often involve an upfront payment by the player, in return for which the player may play for an extended period of time, or receive other benefits. However, a player may, for various reasons, wish to discontinue play before having completed the amount of play specified in the contract. For example, if the player has paid $30 for a contract to receive the net winnings of a gaming device after 500 pulls, the player may wish to quit after 250 pulls in order to go have dinner. The player may be given the option of discontinuing play while still receiving a benefit. The benefit a player receives may be related to his current credit balance, to the number of handle pulls made thus far in the contract, to the amount of time played thus far, or to the amount of money he paid upfront for the contract. In one embodiment, the player may receive his expected winnings for the contract as calculated from the point in time at which the player quits. For example, a player's expected winnings from a contract in which he will receive the net winnings from a gaming device may be $20 when he has a credit balance of $35, but 250 handle pulls remaining in the contract. In another embodiment, the player may receive less than his expected winnings, so as to penalize the player for quitting early. Sometimes he may receive more than his expected winnings, as the gaming device will benefit from being open for business with new players.

Upon surrender, a player might also receive a fraction of his upfront payment. A player might receive half of his current credit balance. In one embodiment, a player with a negative credit balance may actually receive, say, $5 for ceasing play. Perhaps the contract says that the player gets to keep any net winnings, but is not responsible for net losses. Thus, a player with a negative balance, especially if the credit balance is only slightly negative, might still have high expected winnings. However, a player might perceive $5 as fairly valuable in relation to his current credit balance, and so may surrender in return for the $5. Thus, in one embodiment, a gaming device encourages players to surrender by offering them cash or other benefits to surrender.

In many embodiments, the casino acts as the intermediary in transactions between a player and the insurer. The casino is an intermediary, for example, when its gaming devices collect a player's payment for a contract, even though that payment is meant to go to the insurer. The casino is also an intermediary when it does not collect losses from a player, but from an insurer.

Since the casino may engage in many transactions with the insurer, it would potentially be inefficient for the casino to transfer money to the insurer, or vice versa, after every transaction. Therefore, the casino or the insurer may maintain records (FIG. 8) of how much one owes the other. The casino and the insurer may then settle their accounts periodically. If the casino owes the insurer money, then the casino may wire money to the insurer. If the insurer owes the casino, then the insurer may wire money. Of course, many other methods of settlement are possible.

In cases where a contract has resulted in a net win for the player, the player must be paid. If the player is at the casino, he may enter into a gaming device a password or other identifier of himself or of his contract. The gaming device may then access a database in the casino server containing the details of the contract, including the amount owed to the player (FIG. 8). The gaming device may then pay the amount owed in the form of cash, tokens, paper receipts or vouchers, digital cash, digital receipts, etc. The player may also collect his winnings at a casino desk, perhaps after presenting identification.

If a player is remote from a casino when his contract has finished executing, then the player may be sent his winnings either by the insurer or the casino. If the insurer provides the winnings, then the casino may later reimburse the insurer in the amount of the winnings. The winnings may be sent in the form of cash, check, money order, etc. The winnings may be sent by postal mail, by wire transfer, by direct deposit, by email as digital cash, etc.

In some embodiments, the casino may simply keep the player's winnings in a player account at a casino, to be accessed by the player next time he visits the casino. The winnings may, in the mean time, accumulate interest. The casino (or insurer) may also alert the player that his contract has finished executing and that he has winnings. The player may be instructed to come to the casino and pick them up.

In some embodiments, the player may have left instructions to take any winnings from a first contract and purchase a second contract. This allows for the notion of a meta-contract. Just as a contract may specify how to allocate money for pulls, a meta-contract would describe how to allocate money for contracts. There could then be meta-meta-contracts, and so on.

In one embodiment, a player may be halfway through a contract and have negative 200 accumulated credits. The player might therefore lose all hope of winning enough to overcome the 200-credit deficit, and so lose interest in the contract. Therefore, in one embodiment, a player who is well below a threshold number of accumulated credits for winning may play for an altered pay table. Low paying outcomes may be eliminated, while the likelihood of achieving high paying outcomes may increase. This is because a player with a 200-credit deficit probably doesn't care about a win of ten credits, but does care about a win of 500 credits. The overall hold percentage of the machine may remain constant. In some embodiments, the alteration of the pay tables is an automatic function of the number of pulls remaining and the credit deficit of the player. In other embodiments, the player must request an alteration of the pay tables. As an example, a player may select an option that says, "Let me play just for the jackpot. Eliminate everything else and make the jackpot more likely." The player may or may not have to pay for an alteration of the pay tables. In a more general sense, the pay tables may change such that the standard deviation of the payout for a particular handle pull changes even as hold percentage may remain constant.

A player might purchase a contract at a casino desk and receive a token that indicates the type of contract. The player might then deposit the token into a gaming device. The gaming device would then recognize the token and be able to execute the contract.

A player may have the privilege of entering into favorable contracts after a fixed amount of initial betting. For example, if the player wagers for an hour, he may be able to enter into a contract where each pull is at true odds. That is each pull pays back, on average, the same amount that was put in. Typically the pull pays back less.

A player may receive better odds on contract play when he is recommended to the casino by a friend.

Certain results of a pull may terminate a contract early. For example, if a player hits the jackpot, the contract may terminate.

A player's accumulated credits can be displayed to a player as a function of time in the form of a graph. The graph may look much like graphs used to plot the price of a stock market index as a function of time. In some embodiments, a player wins money or some other prize if the graph takes on a certain shape. For example, if the line of the graph is such that it slips between several sets of markers (much like a skier on a slalom course), then the player may win a large prize.

In some embodiments, a player's winnings on each pull of the contract are reinvested into the contract, whereas in other embodiments they are not. In one example, a player purchases a contract for $100. The player instructs the gaming device to gamble the $100 until it is all gone. However, any winnings are not to be used to gamble, they are to be sent directly to the player. In a second example, the player purchases a contract for $100 and instructs the gaming device to gamble the $100 until it is gone or until it has become $200. Here, the player elects to reinvest winnings, using the winnings to pay for new handle pulls even after $100 worth of handle pulls has been made already.

A contract may reward a player based on any second order data, or meta-data about one or more outcomes. Examples include rewarding the player if three like outcomes occur in a row, if 20 cherries come up in 10 sequential spins, if the players accumulated credits ever reach 100, etc. An example previously described is rewarding a player based on the pattern of a graph of accumulated winnings as a function of time. A player might choose the "meta-outcomes" on which he desires to be rewarded, and the gaming device may figure the corresponding odds and the size of the reward should the meta-outcome occur.

A player may be rewarded with the downside a sequence of outcomes much as buying insurance gives him the upside. For example, a player pays a fixed sum of money, and collects winnings for every dollar in the negative the contract ends up. Thus, if a contract ends with the player having minus 20 accumulated credits, then the player collects 20 credits.

A contract may apply to a "best 100" sequence of a larger sequence of pulls. For example, the player pays $100 for a contract of 1000 pulls. From those 1000 pulls, the player gets to choose any 100 consecutive outcomes to determine his winnings, and can disregard the rest of the outcomes. So the player can say he wants to use outcomes 506 through 605. Perhaps there was a hot streak during that sequence. The player's winnings are then determined solely based on what happened between pulls 506 and 605. This might result in winnings of $200, whereas having counted all 1000 pulls would have resulted in a net loss for the player. Of course, the gaming device may automatically choose the most favorable sequence for the player.

A player may choose his favorite outcome and receive higher payouts for that outcome, special privileges for receiving that outcome (e.g. the ability to terminate a contract), etc.

In some types of contracts, the pay table for the gaming device changes based on the player's credit balance. For example, the pay table may change to provide a lower payback percentage once a player's credit balance exceeds a certain threshold. The pay table may or may not revert if the player's balance then goes below the threshold. In one embodiment, completely different pay tables are used depending on whether the player's credit balance is above or below a certain level.

A contract could provide extra bonuses to the player if the player gets his credit balance to a certain level. For example, a player might begin with a credit balance of 50. If he can get his credit balance to 100, he may receive $500 at the end of the contract, or he might receive 500 credits in the context of the contract. A player might also receive a bonus for getting his credit balance to zero from 50.

An exemplary process according to one embodiment is described immediately below. This description is provided solely as an example of one embodiment. A player with a group of her friends planned to spend four hours at a casino before leaving. However, the player began playing a slot machine with a losing streak, and after two hours, she was down to her last $20. Meanwhile, her friends were doing fairly well, so it seemed that the player would have to spend her next two hours in the casino doing nothing but waiting for her friends.

Instead, the player decided to purchase a gaming contract in order to guarantee that her $20 would last for the next two hours. The player sat down at a dollar slot machine. The slot machine had a touch screen displaying an initial menu. One of the menu choices was "contract play." She pressed that choice and received a second menu that presented several contract options. One option was "1½ hours of play for $20 at 6 pulls per minute." The player chose that option because it would fill most of the rest of her time at the casino for $20, all she could afford. The screen on the slot machine then directed her to insert $20 into the slot machine in order to begin play, and the player did so.

The slot machine then presented the player with a final screen showing the main terms of the contract. According to the terms, the player would begin with a balance of zero credits. The player's balance would go down by one credit anytime she initiated a handle pull of the slot machine. In fact, the player would be able to keep playing even if her credit balance were negative. Her credit balance would also increase on any handle pull where she achieved a winning outcome. At the end of her gaming session, the player would keep the amount of any positive credit balance. However, if her credit balance ended up negative, she would win nothing, though she would also not be responsible for repaying any portion of the negative balance. Another term was that the player was not allowed to make less than six pulls per minute during the execution of the gaming session of the contract. If the player tried to pull too slowly, then the slot machine would initiate pulls for her automatically.

The player agreed to proceed and was soon busy gambling. She watched as her credit balance rose and fell. Near the end of her contract number of pulls, the player's credit balance stood at minus 10. But immediately after that, on the next pull, she won a payout of 30 credits, putting her balance at 20 credits (positive). In the end, after 1½ hours of play, the player ended up with 17 credits. She received $17. Although she had lost $3 ($20–$17), she had been able to play for 1½ hours, and had a good time doing so. When she had finished with the contract, her friends were also finishing up and getting ready to depart.

Although the present invention has been described with respect to a preferred embodiment thereof, those skilled in the art will note that various substitutions may be made to those embodiments described herein without departing from the spirit and scope of the present invention The invention is claimed as follows:

1. A method of operating a gaming system, said method comprising:

(a) if a physical item is received via an acceptor of a gaming device, causing a processor to establish a credit balance of a quantity of credits available for waging, said credit balance being based, at least in part, on a monetary value associated with the received physical item, wherein said physical item is selected from the group consisting of: a ticket associated with the monetary value and a unit of currency;

(b) causing the processor to determine a quantity of available spins of a plurality of reels of the gaming device, wherein the quantity of available spins is greater than zero, the quantity of available spins is distinct from the credit balance of the quantity of credits available for wagering on the gaming device and each available spin is associated with an average expected payout prior to any generation of any symbols associated with said available spin;

(c) receiving an input to elect to use at least one of the available spins for a single generation of a plurality of symbols for a single play of a game;

(d) causing the processor to deduct the at least one spin from the determined quantity of available spins;

(e) for the single play of the game, causing the processor to initiate a spin of the plurality of reels of the gaming device, wherein:

(i) if a first quantity of at least one of the available spins is used to generate the plurality of symbols for the single play of the game, a first paytable having a first average expected payout is employed to evaluate said generated symbols for the single play of the game, said first average expected payout of the first paytable being at least partially based on the average expected payouts of each of the first quantity of at least one of the available spins used to generate the plurality of symbols for the single play of the game, (ii) if a second, different quantity of the available spins is used to generate the plurality of symbols for the single play of the game, a second, different paytable having a second average expected payout is employed to evaluate said generated symbols for the single play of the game, said second average expected payout being greater than the first average expected payout, said second quantity of the available spins used for the single play of the game being greater than the first quantity of available spins used for the single play of the game and said second average expected payout of the second paytable being at least partially based on the average expected payouts of each of the second quantity of at least one of the available spins used to generate the plurality of symbols for the single play of the game, and (iii) said credit balance is increasable based on any award associated with the generated symbols for the single play of the game; and (f) if a cashout input is received via a cashout device of the gaming device, causing an initiation of any payout associated with the credit balance.

2. The method of claim 1, which includes:

causing the processor to deduct, upon initiation of the spin of the plurality of reels for the single play of the game, at least a portion of at least one credit from the balance of credits available for wagering on the gaming device.

3. The method of claim 1, wherein the quantity of available spins includes a quantity of spins purchased by a player.

4. The method of claim 1, wherein at least one of the quantity of available spins has been won by a player as a result of a previous game played on the gaming device.

5. The method of claim 4, wherein the spin of the plurality of reels for the single play of the game includes a spin associated with only winning game outcomes.

6. A gaming device, comprising:

a housing a display device supported by the housing;

a processor;

a plurality of input devices supported by the housing, said plurality of input devices including:

(i) an acceptor, and (ii) a cashout device; and a memory device storing a program, which when executed by the processor, cause the processor to operate with the display device and the plurality of input devices to:

(a) if a physical item is received via the acceptor, establish a credit balance based, at least in part, on a monetary value associated with the received physical item, wherein said physical item is selected from the group consisting of: a ticket associated with the monetary value and a unit of currency;

(b) determine a quantity of spins available for use, the quantity of spins being greater than zero, the quantity of spins being distinct from the credit balance of a quantity of credits available for wagering on the gaming device and each available spin being associated with an average expected payout prior to any generation of any symbols associated with said available spin;

(c) receive an input to elect to use at least one of the available spins for a single generation of a plurality of symbols for a single play of a game;

(d) deduct the at least one spin from the determined quantity of available spins;

(e) for the single play of the game, initiating a spin of a plurality of reels, wherein:

(i) if a first quantity of at least one of the available spins is used to generate the plurality of symbols for the single play of the game, a first paytable having a first average expected payout is employed to evaluate said generated symbols for the single play of the game, said first average expected payout of the first paytable being at least partially based on the average expected payouts of each of the first quantity of at least one of the available spins used to generate the plurality of symbols for the single play of the game, (ii) if a second, different quantity of the available spins is used to generate the plurality of symbols for the single play of the game, a second, different paytable having a second average expected payout is employed to evaluate said generated symbols for the single play of the game, said second average expected payout being greater than the first average expected payout, said second quantity of the available spins used for the single play of the game being greater than the first quantity of available spins used for the single play of the game and said second average expected payout of the second paytable being at least partially based on the average expected payouts of each of the second quantity of at least one of the available spins used to generate the plurality of symbols for the single play of the game, and (iii) said credit balance is increasable based on any award associated with the generated symbols for the single play of the game; and (f) if a cashout input is received via the cashout device, cause an initiation of any payout associated with the credit balance.

7. A non-transitory computer-readable medium storing a program comprising instructions, the program, when read by a computer, causing the computer to:

(a) if a physical item is received via an acceptor of a gaming device, establish a credit balance of a quantity of credits available for waging, said credit balance being based, at least in part on a monetary value associated with the received physical item, wherein said physical item is selected from the group consisting of: a ticket associated with the monetary value and a unit of currency;

(b) determine a quantity of available spins of a plurality of reels of the gaming device, wherein the quantity of available spins is greater than zero, the quantity of spins is distinct from the credit balance of the quantity of credits available for wagering on the gaming device and each available spin is associated with an average expected payout prior to any generation of any symbols associated with said available spin;

(c) receive an input to elect to use at least one of the available spins for a single generation of a plurality of symbols for a single play of a game;

(d) deduct the at least one spin from the determined quantity of available spins;

(e) for the single play of the game, initiate a spin of the plurality of reels of the gaming device, wherein:

(i) if a first quantity of at least one of the available spins is used to generate the plurality of symbols for the single play of the game, a first paytable having a first average expected payout is employed to evaluate said generated symbols for the single play of the game, said first average expected payout of the first paytable being at least partially based on the average expected payouts of each of the first quantity of at least one of the available spins used to generate the plurality of symbols for the single play of the game, (ii) if a second, different quantity of the available spins is used to generate the plurality of symbols for the single play of the game, a second, different paytable having a second average expected payout is employed to evaluate said generated plurality of symbols for the single play of the game, said second average expected payout being greater than the first average expected payout, said second quantity of the available spins used for the single play of the game being greater than the first quantity of available spins used for the single play of the game and said second average expected payout of the second paytable being at least partially based on the average expected payouts of each of the second quantity of at least one of the available spins used to generate the plurality of symbols for the single play of the game, and (iii) said credit balance is increasable based on any award associated with the generated symbols for the single play of the game; and (f) if a cashout input is received via a cashout device of the gaming device, cause an initiation of any payout associated with the credit balance.

* * * * *